(12) United States Patent
Boyer

(10) Patent No.: US 12,500,901 B2
(45) Date of Patent: Dec. 16, 2025

(54) METHOD FOR CYBER THREAT RISK ANALYSIS AND MITIGATION IN DEVELOPMENT ENVIRONMENTS

(71) Applicant: Darktrace Holdings Limited, Cambridge (GB)

(72) Inventor: John Anthony Boyer, Cambridge (GB)

(73) Assignee: Darktrace Holdings Limited, Cambridge (GB)

( * ) Notice: Subject to any disclaimer, the term of this patent is extended or adjusted under 35 U.S.C. 154(b) by 756 days.

(21) Appl. No.: 17/859,858

(22) Filed: Jul. 7, 2022

(65) Prior Publication Data

US 2023/0009127 A1 Jan. 12, 2023

Related U.S. Application Data

(60) Provisional application No. 63/219,026, filed on Jul. 7, 2021.

(51) Int. Cl.
*H04L 9/40* (2022.01)
*G06F 11/3604* (2025.01)
(Continued)

(52) U.S. Cl.
CPC ...... *H04L 63/1416* (2013.01); *G06F 11/3604* (2013.01); *G06F 21/53* (2013.01);
(Continued)

(58) Field of Classification Search
CPC ............ H04L 63/1425; H04L 63/1433; H04L 63/1441; H04L 63/1416; H04L 63/20;
(Continued)

(56) References Cited

U.S. PATENT DOCUMENTS 7,171,515 B2 * 1/2007 Ohta .................... G06F 12/127
711/E12.076
9,747,440 B2 * 8/2017 Gupta ................ G06F 11/3013
(Continued)

*Primary Examiner* — Sharif E Ullah
(74) *Attorney, Agent, or Firm* — Rutan and Tucker, LLP

(57) ABSTRACT

A method for a cyber security appliance incorporating data from a source code repository, hosted by a software development environment, to identify cyber threats related to source code being stored and developed in that source code repository is provided. The method comprises: receiving, at one or more modules of the cyber security appliance, data indicating a network entity representing a user's interaction with the source code repository; and comparing the data, received from the one or more modules, to one or more machine learning models trained on a normal benign behavior interacting with the source code repository using a normal behavior benchmark describing parameters corresponding to a normal interaction behavior. The method further comprises identifying whether the data indicating the network entities interaction with the source code repository corresponds to behavior that deviates from the normal benign behavior; identifying whether a threshold level of deviation from the normal benign behavior has been exceeded; and, if the threshold level of deviation from the normal benign behavior has been exceeded, determining that a cyber threat may be present and executing an autonomous response to restrict the network entities interaction with the source code repository.

21 Claims, 6 Drawing Sheets

(51) Int. Cl.
*G06F 21/53* (2013.01)
*G06F 21/57* (2013.01)
*H04L 41/16* (2022.01)

(52) U.S. Cl.
CPC ............ *G06F 21/577* (2013.01); *H04L 41/16* (2013.01); *H04L 63/1425* (2013.01); *H04L 63/1433* (2013.01); *H04L 63/1441* (2013.01); *G06F 2221/034* (2013.01)

(58) Field of Classification Search
CPC ... H04L 63/1408; H04L 63/145; H04L 67/10; H04L 63/0227; H04L 63/0263; G06F 21/577; G06F 21/554; G06F 2221/034; G06F 21/566; G06F 21/552; G06F 21/55; G06F 21/56; G06F 21/53; G06F 16/951; G06F 21/568; G06F 8/65; G06F 21/562; G06F 30/20; H04W 12/12; H04W 12/06; H04W 12/122; H04W 12/128; H04W 12/121; H04W 12/79; H04W 12/125; H04W 12/009; H04W 24/08
USPC .......... 726/22, 2, 21, 36; 713/150, 163, 181; 380/255, 264, 276
See application file for complete search history.

(56) References Cited

U.S. PATENT DOCUMENTS

| | | | |
|---|---|---|---|
| 10,268,821 B2* | 4/2019 | Stockdale | H04L 41/069 |
| 10,419,466 B2* | 9/2019 | Ferguson | G06N 5/022 |
| 10,452,840 B2* | 10/2019 | Chen | H04L 63/1441 |
| 10,701,093 B2* | 6/2020 | Dean | G06F 21/552 |
| 10,728,263 B1* | 7/2020 | Neumann | H04L 63/1416 |
| 2005/0000165 A1* | 1/2005 | Dischinat | E06B 7/23 |
| | | | 49/496.1 |
| 2013/0312101 A1* | 11/2013 | Lotem | G06F 21/55 |
| | | | 726/25 |
| 2014/0053261 A1* | 2/2014 | Gupta | H04L 63/1425 |
| | | | 717/171 |
| 2014/0075414 A1* | 3/2014 | Fox | G06F 8/36 |
| | | | 717/121 |
| 2014/0359552 A1* | 12/2014 | Misra | H04L 67/10 |
| | | | 717/100 |
| 2016/0006629 A1* | 1/2016 | Lanakiev | G06F 21/85 |
| | | | 709/224 |
| 2017/0149813 A1* | 5/2017 | Wright | G06N 7/01 |
| 2017/0295197 A1* | 10/2017 | Parimi | H04L 63/10 |
| 2020/0244673 A1* | 7/2020 | Stockdale | H04L 63/1433 |
| 2020/0274894 A1* | 8/2020 | Argoeti | H04L 63/1433 |
| 2020/0380115 A1* | 12/2020 | Knight | G06F 21/46 |
| 2021/0273958 A1* | 9/2021 | McLean | H04L 63/1433 |

* cited by examiner

METHOD FOR CYBER THREAT RISK ANALYSIS AND MITIGATION IN DEVELOPMENT ENVIRONMENTS

CROSS-REFERENCE TO RELATED APPLICATION

This application claims priority under 35 USC 119 to U.S. Provisional Application No. 63/219,026 filed 7 Jul. 2021, entitled CYBER SECURITY APPLIANCE AND OTHER SECURITY TOOLS, the disclosure of which is hereby expressly incorporated by reference herein in its entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

FIELD

Embodiments of the system provided herein generally relate to a cyber security appliance for application to a development environment for producing software code. In an embodiment, Artificial Intelligence is applied to analyzing behavior related to the software development environment and related events in order to identify potential cyber security threats and to action these threats to provide mitigation.

BACKGROUND

In the cyber security environment, firewalls, endpoint security methods and other tools such as security information and event management systems (SIEMs) and restricted environments, such as sandboxes, are deployed to enforce specific policies and provide protection against certain threats. These tools currently form an important part of an organization's cyber defense strategy, but they are insufficient in the new age of cyber threat.

Cyber threats, including email threats, viruses, Trojan horses, and worms, can subtly and rapidly cause harm to a network. Additionally, human users may wreak further damage to the system by malicious action. Each of these threats can jeopardize the work product of ongoing software development, for example enabling the insertion of malicious lines of code into a project. A cyber security system has to identify each of these cyber threats as they evolve.

Existing solutions for protecting software development environments may be configured to look for known and commonplace vulnerabilities in software code, but the vulnerabilities introduced in malicious attacks, such as supply chain attacks, are designed to be as imperceptible as possible. This means that existing solutions typically need to be tuned to pick up any minor error in code in order to identify such vulnerabilities; however, this often leads to a large number of flaws being detected such that they key vulnerabilities end up hidden amongst a multitude of minor coding flaws. In such a situation, it may not be feasible to process all of the flaws flagged by the solution and important vulnerabilities may end up persisting in the final build of the software development project. The applicant has appreciated that a more advanced system is required to obtain truly actionable intelligence about the cyber security of software code written in a development environment.

SUMMARY

Methods, and apparatus are disclosed for an Artificial Intelligence based cyber security appliance. The Artificial Intelligence based cyber security appliance may incorporate data from a source code repository, hosted by a software development environment, to identify cyber threats related to source code being stored and developed in that source code repository. The method may comprise receiving, at one or more modules of the cyber security appliance, data indicating a network entity representing a user's interaction with the source code repository; and comparing the data, received from the one or more modules, to one or more machine learning models trained on a normal benign behavior interacting with the source code repository using a normal behavior benchmark describing parameters corresponding to a normal interaction behavior.

The method may further comprise identifying whether the data indicating the network entities interaction with the source code repository corresponds to behavior that deviates from the normal benign behavior; and identifying whether a threshold level of deviation from the normal benign behavior has been exceeded; and, if the threshold level of deviation from the normal benign behavior has been exceeded, determining that a cyber threat may be present and executing an autonomous response to restrict the network entities interaction with the source code repository.

These and other features of the design provided herein can be better understood with reference to the drawings, description, and claims, all of which form the disclosure of this patent application.

DRAWINGS

The drawings refer to some embodiments of the design provided herein. In particular:

Figure 1:
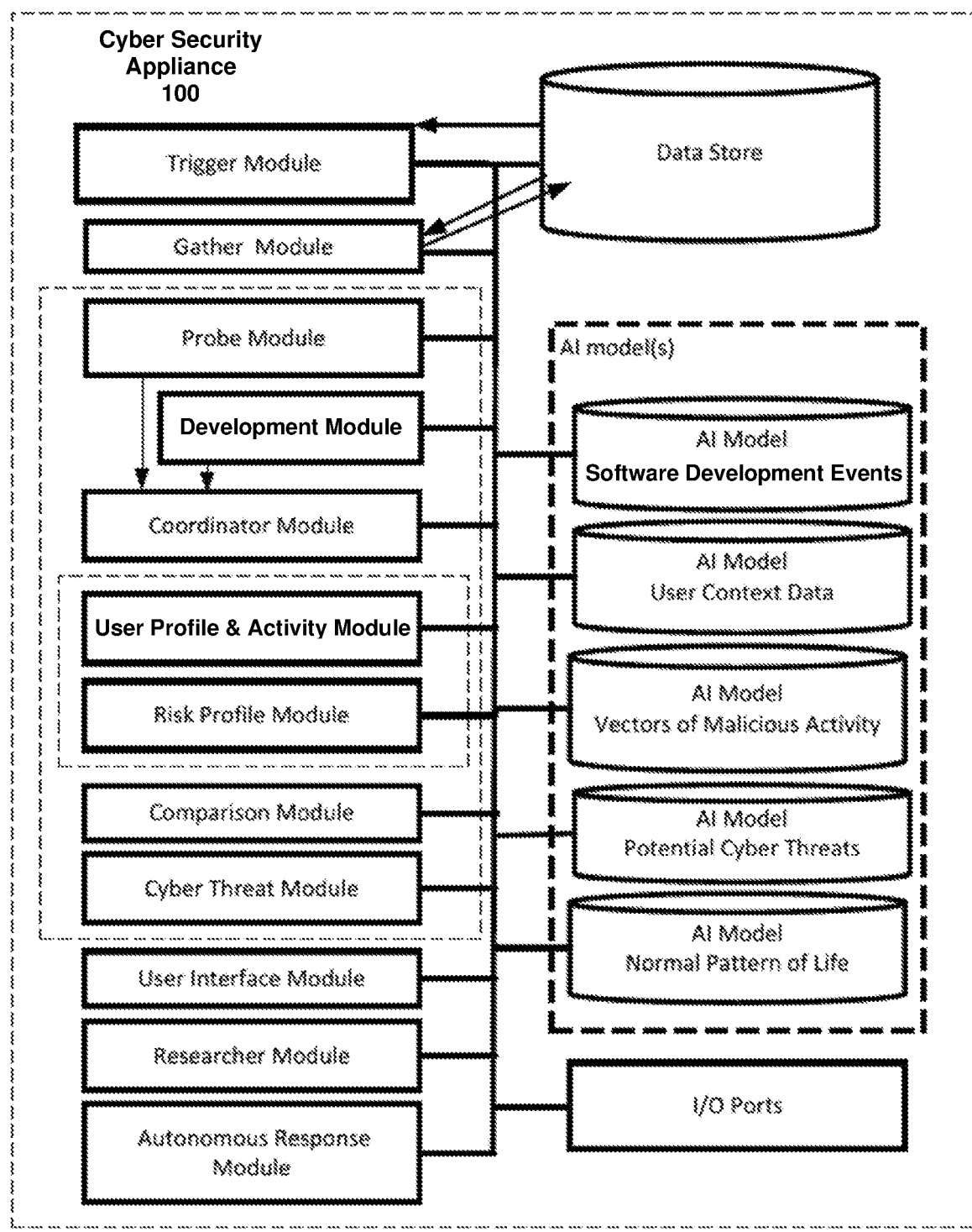
FIG. 1 illustrates an embodiment of a block diagram of an example Artificial Intelligence based cyber security appliance.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

In general, artificial intelligence is used to analyze cyber security threats in the present disclosure. A cyber defense system can use models that are trained on a wide range of characteristics extracted from source code stored on a version control repository, audit logs relating thereto, and activity of the user and their devices in other services.

FIG. 1 illustrates a block diagram of an embodiment of the AI based cyber security appliance 100 that protects a system, including but not limited to a software development ecosystem comprising a local network/domain and one or more of a cloud-based computing platform and a VPN-based computing platform, from cyber threats. Various Artificial Intelligence models and modules of the cyber security appliance 100 cooperate to protect one or more software development ecosystems and corresponding software code projects under analysis from cyber threats.

The cyber security appliance 100 may protect against cyber security threats on a development ecosystem as well as the resulting source code. The cyber security appliance 100 may include components such as i) a trigger module, ii) a gather module, iii) a data store, iv) a probe module, v) a development module, vi) a coordinator module, vii) a user profile and activity module, viii) a risk profile module, ix) a comparison module, x) a cyber threat module, xi) a user interface module, xii) a researcher module, xiii) an autonomous response module, xiv) at least one input or output (I/O) port to securely connect to other ports as required, xv) one or more machine learning models such as multiple Artificial Intelligence models trained on software development events and related activity, multiple Artificial Intelligence models trained on user context data from across the development ecosystem, an Artificial Intelligence model trained on characteristics of vectors for malicious activity and related data, an Artificial Intelligence model trained on potential cyber threats, and one or more Artificial Intelligence models each trained on different users, devices, system activities and interactions between entities in the system, and other aspects of the system to develop a normal pattern of life, as well as xvi) other similar components in the cyber security appliance.

A trigger module may detect time stamped data indicating one or more i) events and/or ii) alerts from I) unusual or II) suspicious behavior/activity are occurring and then triggers that something unusual is happening. Accordingly, the gather module is triggered by specific events and/or alerts of i) an abnormal behavior, ii) a suspicious activity, and iii) any combination of both. The inline data may be gathered on the deployment from a data store when the traffic is observed. The scope and wide variation of data available in this location results in good quality data for analysis.

The data gather module may have a series of one or more process identifier classifiers. A process identifier classifier can identify and track each process and device in the development ecosystem network, making communication connections. A data store cooperates with the process identifier classifier to collect and maintain historical data of processes and their connections, which is updated over time as the network is in operation. Individual processes may be present in merely one or more domains being monitored. In an example, the process identifier classifier can identify each process running on a given device or SaaS environment along with its endpoint connections, which are stored in the data store. The collected data is passed to the comparison module and the cyber threat module.

The gather module may comprise of multiple automatic data gatherers that each look at different aspects of the data depending on the particular hypothesis formed for the analyzed event and/or alert. The data relevant to each type of possible hypothesis will be automatically pulled from additional external and internal sources. Some data is pulled or retrieved by the gather module for each possible hypothesis. A feedback loop of cooperation occurs between the gather module, the probe module monitoring network and email activity, the comparison module to apply one or more models trained on different aspects of this process, and the cyber threat module to identify cyber threats based on comparisons by the comparison module. Each hypothesis of typical threats can have various supporting points of data and other metrics associated with that possible threat, such as a human user insider attack, supply chain attack, inappropriate network behavior, or email behavior or malicious software or malware attack, or inappropriate network behavior. A machine-learning algorithm will look at the relevant points of data to support or refute that particular hypothesis of what the suspicious activity or abnormal behavior related for each hypothesis based on what the suspicious activity or abnormal behavior relates to. Networks have a wealth of data and metrics that may be collected. The gatherers may then filter or condense the mass of data down into the important or salient features of data. In an embodiment, the probe module, the development module, and the coordinator module may be portions of the cyber threat module. The development module may comprise a plurality of further modules, as will be discussed in further detail below in relation to FIG. 5.

A cyber threat module can cooperate with other modules and AI models in the cyber security appliance to confirm a presence of a cyber threat attacking one or more domains in an organization's system. This can cooperate with the same other modules and AI models in the cyber security appliance to conduct a long term investigation and/or a more in-depth investigation on potential cyber threats attacking one or more domains in an organization's system. A process identifier in the cyber threat module can cooperate with the data gatherer module to collect any additional data and metrics to support a possible cyber threat hypothesis. The cyber threat module can also look for other anomalies, such as model breaches, including, for example, deviations for a normal behavior of an entity, and other techniques discussed herein. The cyber threat module can cooperate with the AI models trained on potential cyber threats in order to assist in examining and factoring these additional data points that have occurred over a given timeframe to see if a correlation exists between 1) a series of two or more anomalies occurring within that time frame and 2) possible known and unknown cyber threats. The cyber threat analyst module can cooperate with the internal data sources as well as external data sources to collect data in its investigation.

The cyber threat module in essence allows two levels of investigations of potential cyber threat attacks. In a first level, the module and AI models can rapidly detect and then autonomously respond to overt and obvious cyber threat attacks. However, thousands to millions of low level anomalies may occur in a domain under analysis all of the time; and thus, most other systems need to set the threshold of trying to detect a cyber threat attack at level higher than the low level anomalies examined by the cyber threat analyst module just to not have too many false positive indications of a cyber threat attack when one is not actually occurring, as well as to not overwhelm a human cyber analyst receiving the alerts with so many notifications of low level anomalies that they just start tuning out those alerts. However, advanced persistent threats attempt to avoid detection by making these low level anomalies in the system over time during their attack before making their final coup de grace/ultimate mortal blow against the domain being protected. The cyber threat analyst module conducts investigations over time that can detect these advanced persistent cyber threats actively trying to avoid detection by looking at one or more of these low level anomalies as a part of a chain of linked information.

The cyber threat analyst module forms and investigates hypotheses on what are a possible set of cyber threats and can also conduct an investigation on a possible set of cyber threats hypotheses that would include an anomaly of at least one of i) the abnormal behavior, ii) the suspicious activity, and iii) any combination of both, identified through cooperation with, for example, the one or more AI models trained with machine learning on the normal pattern of life of entities in the system. For example, see FIG. 2, the cyber threat analyst module will perform several additional rounds of gathering additional information over period of time, in this example, examining data over a 7 day period to determine causal links between the information. The cyber threat analyst module will submit to check and recheck various combinations/a chain of potentially related information under analysis until each of the one or more hypotheses on potential cyber threats are one of 1) refuted, 2) supported, or 3) included in a report that includes details of activities assessed to be relevant activities to the anomaly of interest to the user and that also conveys at least this particular hypothesis was neither supported or refuted; and thus, needs a human to further investigate the anomaly of interest included in the chain of potentially related information. Note, a data analysis process can be algorithms/scripts written by humans to perform their function discussed herein; and, can in various cases use AI classifiers as part of their operation. Note, any portions of the AI based cyber security appliance 100 implemented as software can be stored in one or more non-transitory memory storage devices in an executable format to be executed by one or more processors.

Again, an input from the cyber threat analyst module of a supported hypothesis of a potential cyber threat will trigger the module to compare, confirm, and act on that cyber threat. The cyber threat analyst module investigates subtle indicators and/or initially seemingly isolated unusual or suspicious activity such as a worker is logging in after their normal working hours or a simple system misconfiguration has occurred. Most of the investigations conducted by the cyber threat analyst module on unusual or suspicious activities/behavior may not result in a cyber threat hypothesis that is supported but rather most are refuted or simply not supported. Typically during the investigations, several rounds of data gathering to support or refute the long list of potential cyber threat hypotheses formed by the cyber threat analyst module will occur before the algorithms in the cyber threat analyst module will determine whether a particular cyber threat hypothesis is supported, refuted, or needs further investigation by a human. The rounds of data gathering will build chains of linked low level indicators of unusual activity along with potential activities that could be within a normal pattern life for that entity to evaluate the whole chain of activities to support or refute each potential cyber threat hypothesis formed. See again, for example, FIG. 2 and a chain of linked low level indicator all under a 50 on a threat indicator score. The investigations by the cyber threat analyst module can happen over a relatively long period of time and be far more in depth than other modules.

The data gatherer module may further extract data from the data store at the request of the cyber threat analyst module on each possible hypothetical threat that would include the abnormal behavior or suspicious activity and then can assist to filter that collection of data down to relevant points of data to either 1) support or 2) refute each particular hypothesis of what the cyber threat, the suspicious activity and/or abnormal behavior relates to. The data gatherer module cooperates with the cyber threat analyst module to collect data to support or to refute each of the one or more possible cyber threat hypotheses that could include this abnormal behavior or suspicious activity by cooperating with one or more of the cyber threat hypotheses mechanisms to form and investigate hypotheses on what are a possible set of cyber threats.

The cyber threat analyst module is configured to form and investigate hypotheses on what are a possible set of cyber threats with one or more data analysis processes to confirm the results of the investigation on the possible set of cyber threats hypotheses that would include the at least one of i) the abnormal behavior, ii) the suspicious activity, and iii) any combination of both, identified through cooperation with the one or more AI models trained with machine learning on the normal pattern of life of entities in the domains under analysis.

Likewise, the data gatherer module cooperates to supply further requested data and/or metrics when attempting to support or rebut each cyber threat hypothesis. Again, the system can cooperate with the other modules and AI models to rapidly detect and then autonomously respond to overt and obvious cyber threat attacks, including ones found to be supported by the cyber threat analyst module.

As a starting point, the AI-based cyber security appliance 100 can use the trigger module to identify abnormal behavior and/or suspicious activity against the AI models of normal behavior for the entities in the network/domain under analysis, which is supplied to the cyber threat analyst module. The cyber threat analyst module may also receive other inputs such as AI model breaches, AI classifier breaches, a trigger to start an investigation from an external source, etc.

The probe module can be configured to collect probe data from a probe deployed to a network entity. The network entity represents at least one of a user device and a network device interacting with the network. The probe data describes any activity executed by the network entity and administrated by a network administrator associated with the network. Such network-administrated activity would be external to any in source code developed in the development ecosystem, which is hosted by a third-party platform. A network-administered activity may be network activity or Software-as-a-Service (SaaS) activity. Note, the probe module may be divided into an email module and a network module.

The cyber security appliance/cyber threat defense system 100 can incorporate data from a development environment, in particular a code repository and the source code stored thereon. In the context of the following, a development environment may be considered to include both public and private clouds where you run your code, i.e. that code running in the cloud is viewed as an extension of the development environment and included in this definition. The cyber security appliance 100 may include a development module to identify characteristics, labels, or fragments associated with the source code stored in the code repository. A machine-learning module can then be trained based on these data points and used to spot deviations from an expected benchmark. This benchmarking and deviation analysis may be on a per user basis, or inter-user comparisons may be made based on a common class of users, or some other similar common characteristic.

The probe module monitoring network-administered activity and the development module monitoring development environments may each feed their data to a coordinator module to correlate causal links between these activities to supply this input into the cyber threat module. The coordinator module can be configured to contextualize the event data from the development environment the probe data from the one or more probe modules to create a combined data set for analysis. The coordinator module can use a composite user profile to connect events from the development environment with events from the probe module.

A user profile and activity module can construct a composite user profile to identify a user across multiple third-party platforms and compile a record of the user's activity across those platforms. The user profile and activity module can construct a composite user profile describing the user based on user context data collected from multiple SaaS applications operated by multiple third-party platforms. The user profile and activity module can associate the composite user profile with the third-party event data. The user profile and activity module can match the user context data from the context gatherer with separate internal user context data from other context gatherers at internal service modules associated with other applications performed by the internal client network. The user profile and activity module can match the user context data from the context gatherer with separate external user context data from other context gatherers at other modules associated with other SaaS applications operated by other third-party platforms. The user profile and activity module can apply a fuzzy classifier to the user context data from the context gatherer to match with separate user context data. The user profile and activity module can generate a confidence score for a match between the user context data from the context gatherer with separate user context data from other context gatherers at other application modules associated with other applications. The user profile and activity module can adjust the confidence score based on third-party event data from one or more individual modules. The user profile and activity module can confirm a user identity based on a comparison of the third-party event data to a user instruction.

A risk profile module can associate the user with a user risk profile based on the composite user profile. The risk profile module is configured to assign a user importance score to the user risk profile of the user based on the composite user profile to indicate a potential sphere of influence of the user. The potential sphere of influence refers to the number of services and resources that the user can affect. The risk profile module can assess the potential sphere of influence of the user based on at least one of administrative permissions, lateral movement, action persistence, and file access. Lateral movement refers to the ability of a user to move across services. Action persistence refers to the extent that an action by a user can allow that user to either remain in an environment undetected or shift to a new compromise method to remain in the network when detected. For an example of action persistence, a bad actor, acting as the user, can create an inbox rule that forwards all the user's emails to the bad actor in case the user's password is reset to kick the bad actor out of the user's inbox. In a further example of action persistence, a bad actor can have the ability to create new user accounts allowing them to login undetected.

The risk profile module can generate a vulnerability score based on the third-party event data describing the extent of changes a user can make to a file or resource. The risk profile module can factor the user importance score and the vulnerability score into the user risk profile to calculate a degree of damage. The risk profile module can adjust the normal behavior benchmark based on the user risk profile. The user profile and activity module and the risk profile module may be combined into a risk preemptor module.

The cyber threat module may also use one or more machine-learning models trained on cyber threats in the network. The cyber threat module may reference the models that are trained on the normal behavior of user activity, network activity, and development environment activity associated with the network. The cyber threat module can reference these various trained machine-learning models and data from the probe module, the development module, and the trigger module. The cyber threat module can determine a threat risk parameter that factors in how the chain of unusual behaviors correlate to potential cyber threats and 'what is a likelihood of this chain of one or more unusual behaviors of the network activity and user activity under analysis that fall outside of being a normal benign behavior;' and thus, is malicious behavior.

The one or more machine learning models can be self-learning models using unsupervised learning and trained on a normal behavior of different aspects of the system, for example, device activity and user activity associated with a SaaS application used in the development environment. The self-learning models of normal behavior are regularly updated. The self-learning model of normal behavior is updated when new input data is received that is deemed within the limits of normal behavior. A normal behavior threshold is used by the model as a moving benchmark of parameters that correspond to a normal pattern of life for the computing system. The normal behavior threshold is varied according to the updated changes in the computer system allowing the model to spot behavior on the computing system that falls outside the parameters set by the moving benchmark.

The comparison module can compare the analyzed metrics on the user activity and network activity compared to their respective moving benchmark of parameters that correspond to the normal pattern of life for the computing system used by the self-learning machine-learning models and the corresponding potential cyber threats.

The comparison module is configured to execute a comparison of input data to at least one machine-learning model to spot behavior on the network deviating from a normal benign behavior of that network entity. The comparison module receives the combined data set from the coordinator module. The at least one machine-learning model is trained on a normal benign behavior of a network entity. The at least one machine uses a normal behavior benchmark describing parameters corresponding to a normal pattern of activity for that network entity. The comparison module can use the comparison to identify whether the network entity is in a breach state of the normal behavior benchmark.

The comparison module can be integrated with the cyber threat module. The cyber threat appliance/cyber threat defense system 100 may also include one or more machine-learning models trained on gaining an understanding of a plurality of characteristics on a transmission and related data including classifying the properties of the transmission and its metadata. The cyber threat module can then determine, in accordance with the analyzed metrics and the moving benchmark of what is considered normal behavior, a cyber-threat risk parameter indicative of a likelihood of a cyber-threat.

The cyber threat appliance 100 may also include one or more machine learning models trained on gaining an understanding of a plurality of characteristics on a SaaS administrative event and related data including classifying the properties of the SaaS administrative event and its meta data.

The cyber threat module can also reference the machine learning models trained on a SaaS administrative event and related data to determine if a SaaS administrative event or a series of SaaS administrative events under analysis have potentially malicious characteristics. The cyber threat module can also factor this SaaS administrative event characteristics analysis into its determination of the threat risk parameter. The cyber threat module can generate a set of incident data describing an anomalous event by an entity, here representing a user or a device participating in the network. The cyber threat module can use the incident data to determine whether the anomalous event indicates a breach state representing a malicious incident or confidential data exposure. To do this, the cyber threat module can use the user interface and display module to present the incident data to a user analyst for review. Alternately, the cyber threat module can execute an autonomous analyst to use machine learning to determine whether the entity has entered a breach state.

Alternately, the cyber threat module can execute an autonomous analyst to use machine-learning to determine whether the network entity in the breach state is a cyber threat. The cyber threat module is configured to identify whether the breach state identified by the comparison module and a chain of relevant behavioral parameters deviating from the normal benign behavior of that network entity correspond to a cyber threat.

The cyber threat defense system 100 may use multiple machine learning models. Each machine learning model may be trained on specific aspects of the normal pattern of life for the system such as devices, users, network traffic flow, outputs from one or more cyber security analysis tools analyzing the system, and others. One or more machine learning models may also be trained on characteristics and aspects of all manner of types of cyber threats. One or more machine learning models may also be trained by observing vectors for malicious activity, such as network activity or emails.

The cyber threat defense system 100 may supplement the data provided to the users and cyber professionals using a researcher module. The researcher module operates an artificial intelligence (AI) algorithm to assess whether the anomalous network activity has previously appeared in other published threat research or known lists of malicious files or internet addresses. The researcher module can consult internal threat databases or external public sources of threat data. The researcher module can collect an outside data set describing at least one of an action or a state related to the cyber threat present outside of the network from at least one data source outside the network.

Many other model breaches of the AI models trained with machine learning on the normal behavior of the system can send an input into the cyber threat analyst module and/or the trigger module to trigger an investigation to start the formation of one or more hypotheses on what are a possible set of cyber threats that could include the initially identified abnormal identified abnormal behavior and/or suspicious activity. Note, a deeper analysis can look at example factors such as i) how long has the endpoint existed or is registered; ii) what kind of certificate is the communication using; iii) is the endpoint on a known good domain or known bad domain or an unknown domain, and if unknown what other information exists such as registrant's name and/or country; iv) how rare; v) etc.

Note, the cyber threat analyst module in the AI-based cyber security appliance 100 provides an advantage as it reduces the time taken for human led or cybersecurity investigations, provides an alternative to manpower for small organizations and improves detection (and remediation) capabilities within the cyber security platform.

The cyber threat analyst module that forms and investigates hypotheses on what are the possible set of cyber threats can to use hypotheses mechanisms including any of 1) one or more AI models trained on how human cyber security analysts conduct an investigation on a possible set of cyber threats hypotheses that would include at least an anomaly of interest, 2) one or more scripts outlining how to conduct an investigation on a possible set of cyber threats hypotheses that would include at least the anomaly of interest, 3) one or more rules based models on an investigation on a possible set of cyber threats hypotheses how to conduct an investigation on a possible set of cyber threats hypotheses that would include at least the anomaly of interest, and 4) any combination of these. Again the AI models may use supervised machine learning on human-led cyber threat investigations and then steps, data, metrics, and metadata on how to support or to refute a plurality of the possible cyber threat hypotheses, and then the scripts and rules based models will include the steps, data, metrics, and metadata on how to support or to refute the plurality of the possible cyber threat hypotheses.

The cyber security appliance 100 can then take actions to counter detected potential cyber threats. The autonomous response module, rather than a human taking an action, can be configured to cause one or more rapid autonomous actions to be taken to contain the cyber threat when the threat risk parameter from the cyber threat module is equal to or above an actionable threshold. The cyber threat module's configured cooperation with the autonomous response module, to cause one or more autonomous actions to be taken to contain the cyber threat, which may improve computing devices in the development ecosystem system by limiting an impact of the cyber threat from further editing the source code in the development ecosystem. This may be resolved on the basis of some human intervention.

The autonomous response module can interact with the development module and the cyber threat module to automatically respond to any issues in the development environment. The cyber threat module may analyze the third-party event data from a third-party platform administrating and hosting the source code, and/or one or more SaaS applications to identify any cyber threats. The cyber threat module may generate a threat risk parameter listing a set of values describing aspects of a potential cyber threat. The autonomous response module is configured to compare the threat risk parameter to a benchmark matrix having a set of benchmark scores to determine an autonomous response. The autonomous response module is configured to identify at least one autonomous response to take in response to the cyber threat based on the threat risk parameter. A connector may query a third-party platform administrating and hosting source code in a development environment to discover available responses to a cyber threat, such as suspension of user accounts or curtailing user privileges. The development module may collect those responses from the connector to provide to the autonomous response module.

The autonomous response module may tag a specific user to have a lower threshold for an autonomous response, depending on the circumstances of the cyber threat. For example, a senior developer may have a broader range of permissions, such as coding components that provide responses to external requests. The autonomous response module can simultaneously employ a number of different clustering methods including matrix-based clustering, density based clustering, and hierarchical clustering techniques to identify which users to tag with which threat type.

The cyber security appliance 100 may be hosted on a device, on one or more servers, or in its own cyber threat appliance platform.

Training of AI Pre Deployment and then During Deployment

In step 1, an initial training of Artificial Intelligence models trained on cyber threats can occur using unsupervised learning and/or supervised learning on characteristics and attributes of known potential cyber threats including malware, insider threats, and other kinds of cyber threats that can occur within that domain. The AI model learns at least both in the pre-deployment training i) the characteristics and attributes of known potential cyber threats as well as ii) a set of characteristics and attributes of each category of potential cyber threats and their weights assigned on how indicative certain characteristics and attributes correlate to potential cyber threats of that category of threats. The AI models can be trained with machine learning on possible cyber threats such as Linear Regression, Regression Trees, Non-Linear Regression, Bayesian Linear Regression, Deep learning, etc. to learn and understand the characteristics and attributes in that category of cyber threats. Later, when in deployment in a software development environment being protected by the cyber security appliance 100, the AI model can determine whether a potentially unknown threat has been detected via a number of techniques including an overlap of some of the same characteristics and attributes in that category of cyber threats.

Likewise, pre-deployment machine learning training of one or more Artificial Intelligence models trained on a normal behavior of entities in the system can occur. Initial training of one or more Artificial Intelligence models trained with machine learning on a behavior of the pattern of life of the entities in the network/domain of the software development environment can occur where each type of network and/or domain will generally have some common typical behavior with each model trained specifically to understand components/devices, protocols, activity level, etc. to that type of network/system/domain. What is normal behavior of each entity within that system can be established either prior to deployment and then adjusted during deployment or alternatively the model can simply be placed into an observation mode for an initial week or two when first deployed on a network/domain in order to establish an initial normal behavior for entities in the network/domain under analysis. During deployment, what is considered normal behavior will change as each different entity's behavior changes and will be reflected through the use of unsupervised learning in the model such as various Bayesian techniques, clustering, etc. The AI models can be implemented with various mechanisms such a neural networks, decision trees, etc. and combinations of these. Likewise, one or more supervised machine learning AI models are trained to create possible hypotheses and perform cyber threat investigations on agnostic examples of past historical incidents of detecting a multitude of possible types of cyber threat hypotheses previously analyzed by human cyber threat analysis. More on the training of AI models are trained to create one or more possible hypotheses and perform cyber threat investigations will be discussed later.

As discussed in more detail below, the cyber threat module can cooperate with the one or more unsupervised machine learning models trained on the normal pattern of life in order to perform anomaly detection against the actual normal pattern of life for that system to determine whether an anomaly (e.g., the identified abnormal behavior and/or suspicious activity) is malicious or benign. In operation of the cyber security appliance 100, the potential cyber threat can be previously unknown but shares enough (or does not share enough) in common with the traits from the AI models trained on cyber threats to now be identified as malicious or benign. Note, if later confirmed as malicious, then the AI models trained with machine learning on possible cyber threats can update their training. Likewise, as the cyber security appliance 100 continues to operate, then the one or more machine learning models trained on a normal pattern of life for each of the entities in the system can be updated and trained with unsupervised machine learning algorithms. The cyber threat can use any number of data analysis processes (discussed more in detail below and including the agent analyzer data analysis process here) to help obtain system data points so that this data can be fed and compared to the one or more machine learning models trained on a normal pattern of life, as well as the one or more machine learning models trained on potential cyber threats, as well as create and store data points with the connection finger prints.

All of the above AI models can continually learn and train with unsupervised machine learning algorithms on an ongoing basis when deployed in the development environment that the cyber security appliance 100 is protecting.

Next, as discussed further below, during pre-deployment the cyber threat module uses data analysis processes and cooperates with AI models trained on forming and investigating hypotheses on what are a possible set of cyber threats. In addition, another set of AI models can be trained on how to form and investigate hypotheses on what are a possible set of cyber threats and steps to take in supporting or refuting hypotheses. The AI models trained on forming and investigating hypotheses are updated with unsupervised machine learning algorithms when correctly supporting or refuting the hypotheses including what additional collected data proved to be the most useful.

Similarly, during deployment, the data analysis processes (discussed herein) used by the cyber threat module can use unsupervised machine learning to update the initial training learned during pre-deployment, and then update the training with unsupervised learning algorithms during the deployment of the cyber security appliances 100 in the system being protected when various different steps to either i) support or ii) refute the possible set of cyber threats hypotheses worked better or worked worse.

The AI models trained on a normal behavior of entities in a domain under analysis may perform the threat detection through a probabilistic change in a normal behavior through the application of, for example, an unsupervised Bayesian mathematical model to detect behavioral change in computers and computer networks. The Bayesian probabilistic approach can determine periodicity in multiple time series data and identify changes across single and multiple time series data for the purpose of anomalous behavior detection. In an example of email and IT network domains under analysis, email and IT network raw sources of data can be examined along with a large number of derived metrics that each produce time series data for the given metric.

The gatherer module cooperates with a data store. The data store stores comprehensive logs for network traffic observed. These logs can be filtered with complex logical queries and each IP packet can be interrogated on a vast number of metrics in the network information stored in the data store. Similarly, other domains communications and data may be collected and stored in the data store. The gatherer module may consist of multiple automatic data gatherers that each look at different aspects of the data depending on the particular hypothesis formed for the analysed event. The data relevant to each type of possible hypothesis can be automatically pulled from additional external and internal sources. Some data is pulled or retrieved by the gatherer module for each possible hypothesis.

The data store can store the metrics and previous threat alerts associated with network traffic for a period of time, which is, by default, at least 27 days. This corpus of data is fully searchable. The cyber security appliance 100 works with network probes to monitor network traffic and store and record the data and metadata associated with the network traffic in the data store.

The data gather module may have a process identifier classifier. The process identifier classifier can identify and track each process and device in the network, under analysis, making communication connections. A data store cooperates with the process identifier classifier to collect and maintain historical data of processes and their connections, which is updated over time as the network is in operation. In an example, the process identifier classifier can identify each process running on a given device along with its endpoint connections, which are stored in the data store. Similarly, data from any of the domains under analysis may be collected and compared.

Examples of domains/networks under analysis can include any of i) an Informational Technology network, ii) an Operational Technology network, iii) a Cloud service, iv) a SaaS service, v) an endpoint device, vi) an email domain, vii) software code repository and viii) any combinations of these. A domain module is constructed and coded to interact with and understand a specific domain. A first domain module can be an IT network module configured to receive information from and send information to, in this example, IT network based sensors (i.e., probes, taps, etc.). The first domain module also has algorithms and components configured to understand, in this example, IT network parameters, IT network protocols, IT network activity, and other IT network characteristics of the network under analysis. A second domain module is, in this example, an email module. A second domain module can be an email network module configured to receive information from and send information to, in this example, email based sensors (i.e., probes, taps, etc.). The second domain module also has algorithms and components configured to understand, in this example, email parameters, email protocols and formats, email activity, and other email characteristics of the network under analysis. A third or more domain module can also collect domain data from even another domain. The coordinator module is configured to work with various machine learning algorithms and relational mechanisms to i) assess, ii) annotate, and/or iii) position in a vector diagram, a directed graph, a relational database, etc., activity including events occurring, for example, in the first domain compared to activity including events occurring in the second domain. The domain modules can cooperate to exchange and store their information with the data store.

The process identifier classifier in the data gather module can cooperate with additional classifiers in each of the domain modules to assist in tracking individual processes and associating them with entities in a domain under analysis as well as individual processes and how they relate to each other. The process identifier classifier can cooperate with other trained AI classifiers in the modules to supply useful metadata along with helping making logical nexuses.

A feedback loop of cooperation exists between the gatherer module, one or more models trained on different aspects of this process, and the cyber threat analyst module to gather information to determine whether a cyber threat is potentially attacking the networks/domains under analysis.

Determination of Whether Something is Likely Malicious.

In the following examples the cyber threat analyst module can use multiple factors to the determination of whether a process, event, object, entity, etc. is likely malicious.

In an example, the cyber threat analyst module can cooperate with the Artificial Intelligence models trained on potential email cyber threats to detect whether the anomalous activity detected, such as suspicious emails, exhibit traits that may suggest a malicious intent, such as phishing links, scam language, sent from suspicious domains, etc. The cyber threat analyst module can also cooperate with the Artificial Intelligence models trained on potential IT based cyber threats to detect whether the anomalous activity detected, such as suspicious IT links, URLs, domains, user activity, etc., may suggest a malicious intent as indicated by the Artificial Intelligence models trained on potential IT based cyber threats.

In the above example, the cyber threat analyst module can cooperate with the one or more Artificial Intelligence models trained with machine learning on the normal pattern of life for entities in an email domain under analysis to detect, in this example, anomalous emails which are detected as outside of the usual pattern of life for each entity, such as a user, email server, etc., of the email network/domain. Likewise, the cyber threat analyst module can cooperate with the one or more Artificial Intelligence models trained with machine learning on the normal pattern of life for entities in a second domain under analysis (in this example, an IT network) to detect, in this example, anomalous network activity by user and/or devices in the network, which is detected as outside of the usual pattern of life for each entity, such as a user or a device, of the second domain's network under analysis.

Thus, the cyber threat analyst module can be configured with one or more data analysis processes to cooperate with the one or more AI models trained with machine learning on the normal pattern of life in the system, to identify an anomaly of at least one of i) the abnormal behavior, ii) the suspicious activity, and iii) the combination of both, from one or more entities in the system. Note, other sources, such as other model breaches, can also identify at least one of i) the abnormal behavior, ii) the suspicious activity, and iii) the combination of both to trigger the investigation.

Accordingly, during this threat determination process, the cyber threat analyst module can also use AI classifiers that look at the features and determine a potential maliciousness based on commonality or overlap with known characteristics of malicious processes/entities. Many factors including anomalies that include unusual and suspicious behavior, and other indicators of processes and events are examined by the one or more AI models trained on potential cyber threats and/or the AI classifiers looking at specific features for their malicious nature in order to make a determination of whether an individual factor and/or whether a chain of anomalies is determined to be likely malicious.

The cyber threat analyst module can have an external input to ingest threat intelligence from other devices in the network cooperating with the cyber security appliance 100. The cyber threat analyst module can look for other anomalies, such as model breaches, while the AI models trained on potential cyber threats can assist in examining and factoring other anomalies that have occurred over a given timeframe to see if a correlation exists between a series of two or more anomalies occurring within that time frame.

The cyber threat analyst module can combine these Indicators of Compromise with many other weak indicators to detect the earliest signs of an emerging threat, including previously unknown threats, without using strict blacklists or hard-coded thresholds. However, the AI classifiers can also routinely look at blacklists, etc. to identify maliciousness of features looked at.

A deeper analysis of endpoint data can include things like the domain metadata itself that can reveal peculiarities and as such one or more indicators of potentially a malicious domain, such as its URL, then this could help confirm an analysis to determine that indeed a cyber threat has been detected. The cyber threat module can also look at factors of how rare the endpoint connection is, how old the endpoint is, where geographically the endpoint is located, how a security certificate associated with a communication is verified only by endpoint or by external third party, just to name a few additional factors. The cyber threat analyst module can then assign weighting given to these factors in the machine learning that can be supervised based on how strongly that characteristic has been found to match up to actual malicious sites in the training.

In another AI classifier to find potentially malicious indicators, the agent analyzer data analysis process in the cyber threat analyst module may cooperate with the process identifier classifier to identify all of the additional factors of i) whether one or more processes are running independently of other processes, ii) whether the one or more processes running independent are recent to this network, and iii) whether the one or more processes running independent connect to the endpoint, which the endpoint is a rare connection for this network, which are referenced and compared to one or more AI models trained with machine learning on the normal behavior of the pattern of life of the system.

Note, a user agent, such as a browser, can act as a client in a network protocol used in communications within a client—server distributed computing system. In particular, the Hypertext Transfer Protocol (HTTP) identifies the client software originating (an example user agent) the request, using a user-agent header, even when the client is not operated by a user. Note, this identification can be faked, so it is only a weak indicator of the software on its own, but when compared to other observed user agents on the device, this can be used to identify possible software processes responsible for requests.

The cyber threat analyst module may use the agent analyzer data analysis process that detects a potentially malicious agent previously unknown to the system to start an investigation on one or more possible cyber threat hypotheses. The determination and output of this step is what are possible cyber threats that can include or be indicated by the identified abnormal behavior and/or identified suspicious activity identified by the agent analyzer data analysis process.

In an example, the cyber threat analyst module can use the agent analyzer data analysis process and the AI models trained on forming and investigating hypotheses on what are a possible set of cyber threats to use the machine learning and/or set scripts to aid in forming one or more hypotheses to support or refute each hypothesis. The cyber threat analyst module can cooperate with the AI models trained on forming and investigating hypotheses to form an initial set of possible hypotheses, which needs to be intelligently filtered down.

The cyber threat analyst module can be configured to use the one or more supervised machine learning models trained on:
  agnostic examples of past history of detection of a multitude of possible types of cyber threat hypotheses previously analyzed by human, who was a cyber security professional,
  a behavior and input of how a plurality of human cyber security analysts make a decision and analyze a risk level regarding and a probability of a potential cyber threat,
  steps to take to conduct an investigation start with anomaly via learning how expert humans tackle investigations into specific real and synthesized cyber threats and then the steps taken by the human cyber security professional to narrow down and identify a potential cyber threat, and
  what type of data and metrics that were helpful to further support or refute each of the types of cyber threats, in order to determine a likelihood of whether the abnormal behavior and/or suspicious activity is either i) malicious or ii) benign?

The cyber threat analyst module using AI models, scripts and/or rules based modules is configured to conduct initial investigations regarding the anomaly of interest, collected additional information to form a chain of potentially related/linked information under analysis and then form one or more hypotheses that could have this chain of potentially information related/link under analysis and then gather additional information in order to refute or support each of the one or more hypotheses.

In an example, a behavioral pattern analysis of what are the unusual behaviors of the network/system/device/user under analysis by the machine learning models may be as follows. The coordinator module can tie the alerts, activities, and events from, in this example, the email domain to the alerts, activities, and events from the IT network domain.

Figure 2:
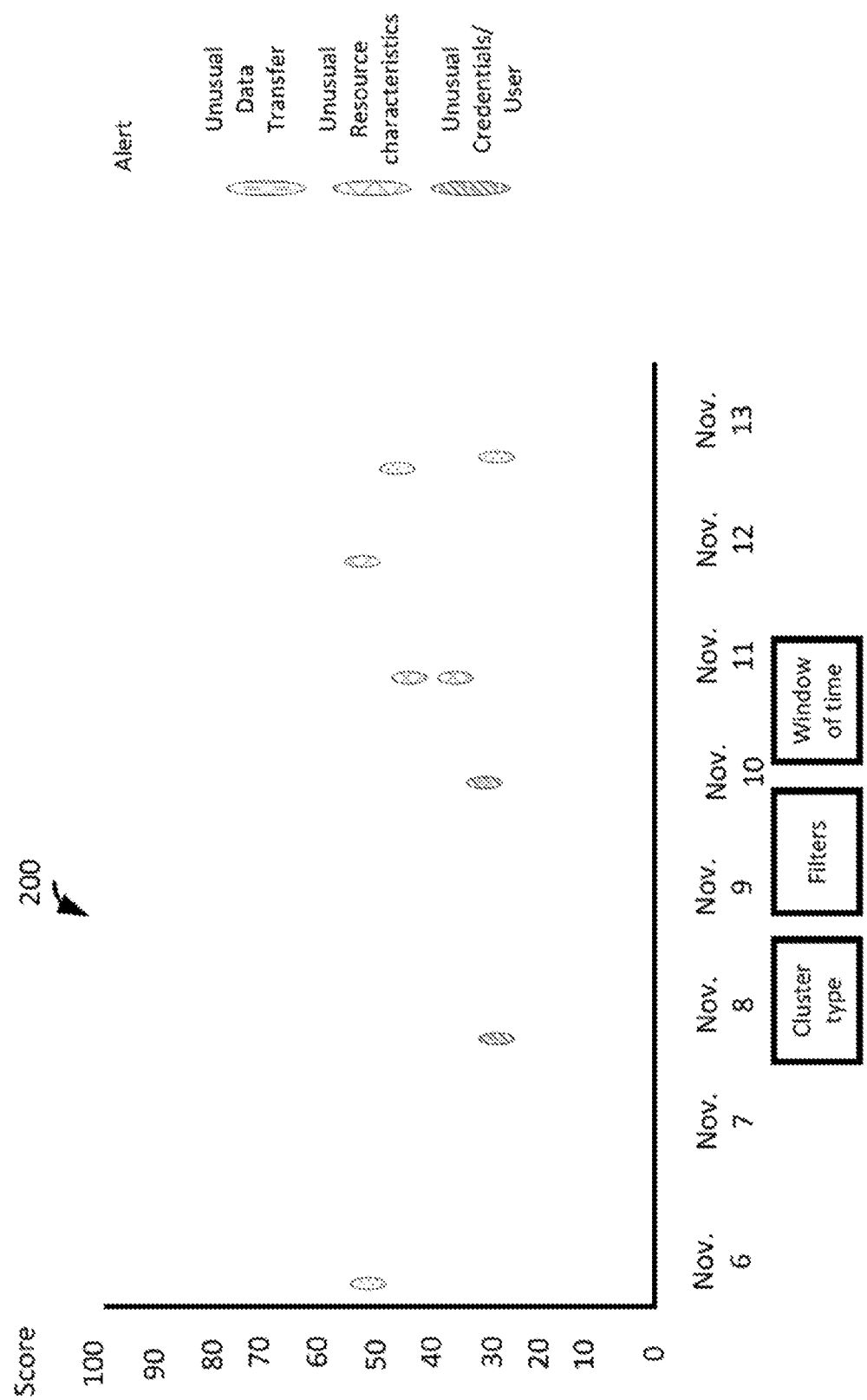
FIG. 2 illustrates a graph of an embodiment of an example chain of unusual behavior deviating from a normal pattern of life.

FIG. 2 illustrates a graph 200 of an embodiment of an example chain of unusual behavior for, in this example, the email activities deviating from a normal pattern of life in connection with the rest of the network under analysis. The cyber threat analysist module can cooperate with one or more machine learning models. The one or more machine learning models are trained and otherwise configured with mathematical algorithms to infer, for the cyber-threat analysis, 'what is possibly happening with the chain of distinct alerts, activities, and/or events, which came from the unusual pattern,' and then assign a threat risk associated with that distinct item of the chain of alerts and/or events forming the unusual pattern. The unusual pattern can be determined by examining initially what activities/events/alerts that do not fall within the window of what is the normal pattern of life for that network/system/device/user under analysis can be analyzed to determine whether that activity is unusual or suspicious. A chain of related activity that can include both unusual activity and activity within a pattern of normal life for that entity can be formed and checked against individual cyber threat hypothesis to determine whether that pattern is indicative of a behavior of a malicious actor—human, program, or other threat.

The cyber threat analyst module can go back and pull in some of the normal activities to help support or refute a possible hypothesis of whether that pattern is indicative of a behavior of a malicious actor. An example behavioral pattern included in the chain is shown in the graph over a time frame of, an example, 7 days. The cyber threat analyst module detects a chain of anomalous behavior of unusual data transfers three times, unusual characteristics in emails in the monitored system three times which seem to have some causal link to the unusual data transfers. Likewise, twice unusual credentials attempted the unusual behavior of trying to gain access to sensitive areas or malicious IP addresses and the user associated with the unusual credentials trying unusual behavior has a causal link to at least one of those three emails with unusual characteristics. Again, the cyber security appliance 100 can go back and pull in some of the normal activities to help support or refute a possible hypothesis of whether that pattern is indicative of a behavior of a malicious actor.

The cyber threat module can cooperate with one or more models trained on cyber threats and their behavior to try to determine if a potential cyber threat is causing these unusual behaviors. The cyber threat analyst module can put data and entities into 1) a directed graph and nodes in that graph that are overlapping or close in distance have a good possibility of being related in some manner, 2) a vector diagram, 3) relational database, and 4) other relational techniques that will at least be examined to assist in creating the chain of related activity connected by causal links, such as similar time, similar entity and/or type of entity involved, similar activity, etc., under analysis.

If the pattern of behaviors under analysis is believed to be indicative of a malicious actor, then a score of how confident is the system in this assessment of identifying whether the unusual pattern was caused by a malicious actor is created. Next, also assigned is a threat level score or probability indicative of what level of threat does this malicious actor pose. Lastly, the cyber security appliance 100 is configurable in a user interface, by a user, enabling what type of automatic response actions, if any, the cyber security appliance 100 may take when different types of cyber threats, indicated by the pattern of behaviors under analysis, that are equal to or above a configurable level of threat posed by this malicious actor.

The chain the individual alerts, activities, and events that form the pattern including one or more unusual or suspicious activities into a distinct item for cyber-threat analysis of that chain of distinct alerts, activities, and/or events. The cyber-threat module may reference the one or more machine learning models trained on, in this example, e-mail threats to identify similar characteristics from the individual alerts and/or events forming the distinct item made up of the chain of alerts and/or events forming the unusual pattern.

Cyber Threat Assessment for Autonomous Response

In the next step, the cyber threat analyst module generates one or more supported possible cyber threat hypotheses from the possible set of cyber threat hypotheses. The cyber threat module generates the supporting data and details of why each individual hypothesis is supported or not. The cyber threat module can also generate one or more possible cyber threat hypotheses and the supporting data and details of why they were refuted.

In general, the cyber threat cooperates with the following three sources. The cyber threat cooperates with the AI models trained on cyber threats to determine whether an anomaly such as the abnormal behavior and/or suspicious activity is either 1) malicious or 2) benign when the potential cyber threat under analysis is previously unknown to the cyber security appliance 100. The cyber threat cooperates with the AI models trained on a normal behavior of entities in the network under analysis. The cyber threat cooperates with various AI-trained classifiers. With all of these sources, when they input information that indicates a potential cyber threat that is i) severe enough to cause real harm to the network under analysis and/or ii) a close match to known cyber threats, then the cyber threat can make a final determination to confirm that a cyber threat likely exists and send that cyber threat to the assessment module to assess the threat score associated with that cyber threat. Certain model breaches will always trigger a potential cyber threat that the analyzer will compare and confirm the cyber threat.

In the next step, an assessment module with the AI classifiers is configured to cooperate with cyber threat. The cyber threat supplies the identity of the supported possible cyber threat hypotheses from the possible set of cyber threat hypotheses to the assessment module. The assessment module with the AI classifiers cooperates with the AI model trained on possible cyber threats can make a determination on whether a cyber threat exists and what level of severity is associated with that cyber threat. The assessment module with the AI classifiers cooperates with the one or more AI models trained on possible cyber threats in order assign a numerical assessment of a given cyber threat hypothesis that was found likely to be supported by the cyber threat with the one or more data analysis processes, via the abnormal behavior, the suspicious activity, or the collection of system data points. The assessment module with the AI classifiers output can be a score (ranked number system, probability, etc.) that a given identified process is likely a malicious process.

The assessment module with the AI classifiers can be configured to assign a numerical assessment, such as a probability, of a given cyber threat hypothesis that is supported and a threat level posed by that cyber threat hypothesis which was found likely to be supported by the cyber threat, which includes the abnormal behavior or suspicious activity as well as one or more of the collection of system data points, with the one or more AI models trained on possible cyber threats.

The cyber threat analyst module in the AI based cyber security appliance 100 component provides an advantage over competitors' products as it reduces the time taken for cybersecurity investigations, provides an alternative to manpower for small organizations and improves detection (and remediation) capabilities within the cyber security platform.

The AI-based cyber threat analyst module performs its own computation of threat and identifies interesting network events with one or more processors. These methods of detection and identification of threat all add to the above capabilities that make the AI-based cyber threat analyst module a desirable part of the cyber security appliance 100. The AI-based cyber threat analyst module offers a method of prioritizing which is not just a summary or highest score alert of an event evaluated by itself equals the most bad, and prevents more complex attacks being missed because their composite parts/individual threats only produced low-level alerts.

The AI classifiers can be part of the assessment component, which scores the outputs of the cyber threat. Again as for the other AI classifiers discussed, the AI classifier can be coded to take in multiple pieces of information about an entity, object, and/or thing and based on its training and then output a prediction about the entity, object, or thing. Given one or more inputs, the AI classifier model will try to predict the value of one or more outcomes. The AI classifiers cooperate with the range of data analysis processes that produce features for the AI classifiers. The various techniques cooperating here allow anomaly detection and assessment of a cyber threat level posed by a given anomaly; but more importantly, an overall cyber threat level posed by a series/chain of correlated anomalies under analysis.

In the next step, the formatting module can generate an output such as a printed or electronic report with the relevant data. The formatting module can cooperate with both the cyber threat and the assessment module depending on what the user wants to be reported.

The formatting module is configured to format, present a rank for, and output one or more supported possible cyber threat hypotheses from the assessment module into a formalized report, from a one or more report templates populated with the data for that incident.

The formatting module is configured to format, present a rank for, and output one or more detected cyber threats from the cyber threat or from the assessment module into a formalized report, from a one or more report templates populated with the data for that incident. Many different types of formalized report templates exist to be populated with data and can be outputted in an easily understandable format for a human user's consumption.

The formalized report on the template is outputted for a human user's consumption in a medium of any of 1) printable report, 2) presented digitally on a user interface, 3) in a machine readable format for further use in machine-learning reinforcement and refinement, or 4) any combination of the three.

The formatting module is further configured to generate a textual write up of an incident report in the formalized report for a wide range of breaches of normal behavior, used by the AI models trained with machine learning on the normal behavior of the system, based on analyzing previous reports with one or more models trained with machine learning on assessing and populating relevant data into the incident report corresponding to each possible cyber threat.

The formatting module can generate a threat incident report in the formalized report from a multitude of a dynamic human-supplied and/or machine created templates corresponding to different types of cyber threats, each template corresponding to different types of cyber threats that vary in format, style, and standard fields in the multitude of templates. The formatting module can populate a given template with relevant data, graphs, or other information as appropriate in various specified fields, along with a ranking of a likelihood of whether that hypothesis cyber threat is supported and its threat severity level for each of the supported cyber threat hypotheses, and then output the formatted threat incident report with the ranking of each supported cyber threat hypothesis, which is presented digitally on the user interface and/or printed as the printable report.

In the next step, the assessment module with the AI classifiers, once armed with knowledge that malicious activity is likely occurring/is associated with a given process from the cyber threat, then cooperates with the autonomous response module to take an autonomous action such as i) deny access in or out of the device or the network and/or ii) shutdown activities involving a detected malicious agent.

The autonomous response module, rather than a human taking an action, can be configured to cause one or more rapid autonomous actions in response to be taken to counter the cyber threat. A user interface for the response module can program the autonomous response module i) to merely make a suggested response to take to counter the cyber threat that will be presented on a display screen and/or sent by a notice to an administrator for explicit authorization when the cyber threat is detected or ii) to autonomously take a response to counter the cyber threat without a need for a human to approve the response when the cyber threat is detected. The autonomous response module will then send a notice of the autonomous response as well as display the autonomous response taken on the display screen. Example autonomous responses may include cut off connections, shutdown devices, change the privileges of users, delete and remove malicious links in emails, slow down a transfer rate, and other autonomous actions against the devices and/or users. The autonomous response module uses one or more Artificial Intelligence models that are configured to intelligently work with other third party defense systems in that customer's network against threats. The autonomous response module can send its own protocol commands to devices and/or take actions on its own. In addition, the autonomous response module uses the one or more Artificial Intelligence models to orchestrate with other third party defense systems to create a unified defense response against a detected threat within or external to that customer's network. The autonomous response module can be an autonomous self-learning digital response coordinator that is trained specifically to control and reconfigure the actions of traditional legacy computer defenses (e.g. firewalls, switches, proxy servers, etc.) to contain threats propagated by, or enabled by, networks and the internet. The cyber threat module can cooperate with the autonomous response module to cause one or more autonomous actions in response to be taken to counter the cyber threat, improves computing devices in the system by limiting an impact of the cyber threat from consuming unauthorized CPU cycles, memory space, and power consumption in the computing devices via responding to the cyber threat without waiting for some human intervention.

The trigger module, cyber threat, assessment module, and formatting module cooperate to improve the analysis and formalized report generation with less repetition to consume CPU cycles with greater efficiency than humans repetitively going through these steps and re-duplicating steps to filter and rank the one or more supported possible cyber threat hypotheses from the possible set of cyber threat hypotheses.

Figure 3:
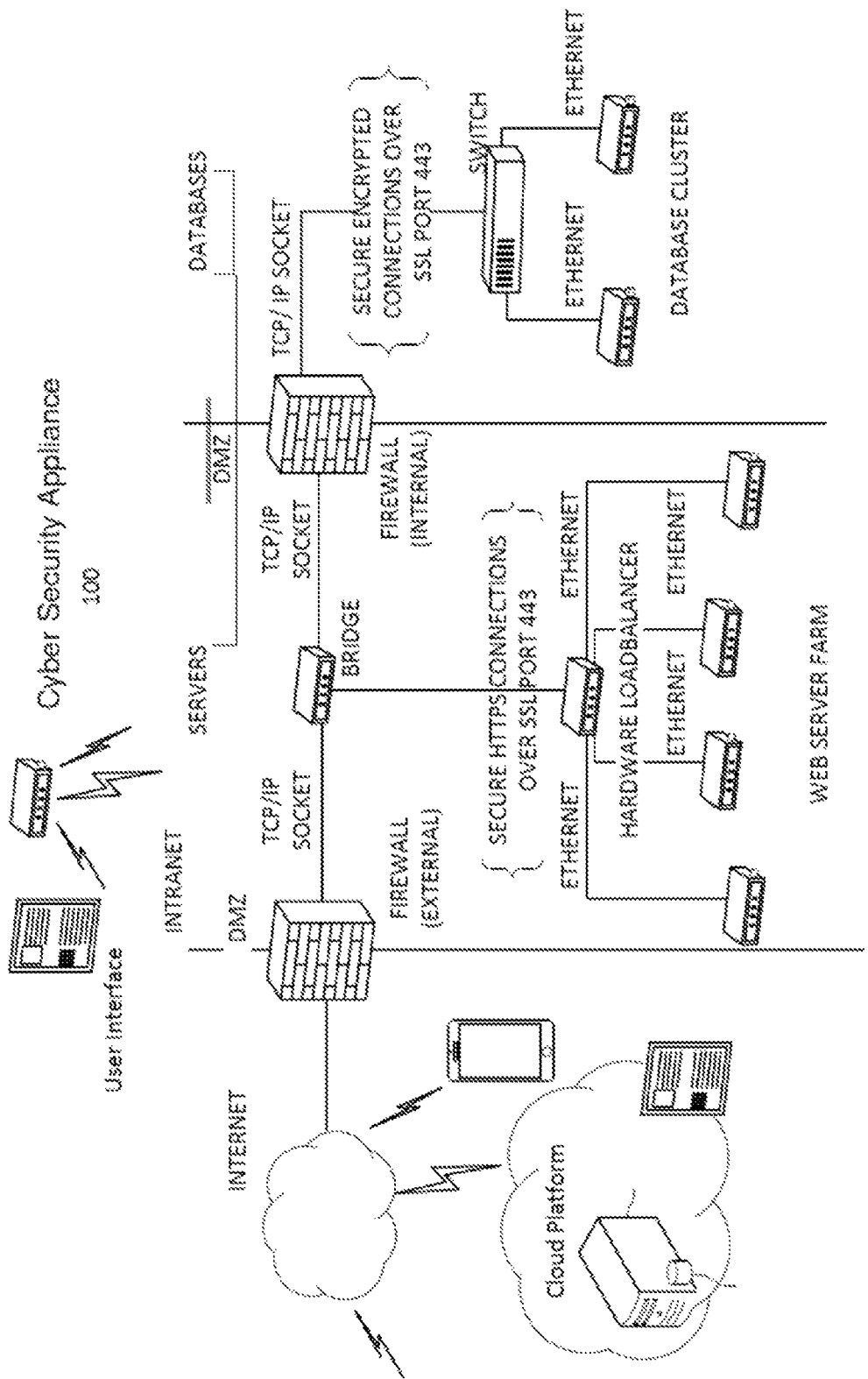
FIG. 3 illustrates a block diagram of an embodiment of the AI based cyber security appliance 100 plugging in as an appliance platform to protect a system.

FIG. 3 illustrates a block diagram of an embodiment of the AI based cyber security appliance 100 plugging in as an appliance platform to protect a system. The probes and detectors monitor, in this example, IT network activity to feed this data to determine what is occurring in each domain individually to their respective modules configured and trained to understand that domain's information as well as correlate causal links between these activities in these domains to supply this input into the modules of the cyber security appliance 100. The network can include various computing devices such as desktop units, laptop units, smart phones, firewalls, network switches, routers, servers, databases, Internet gateways, etc.

Figure 4:
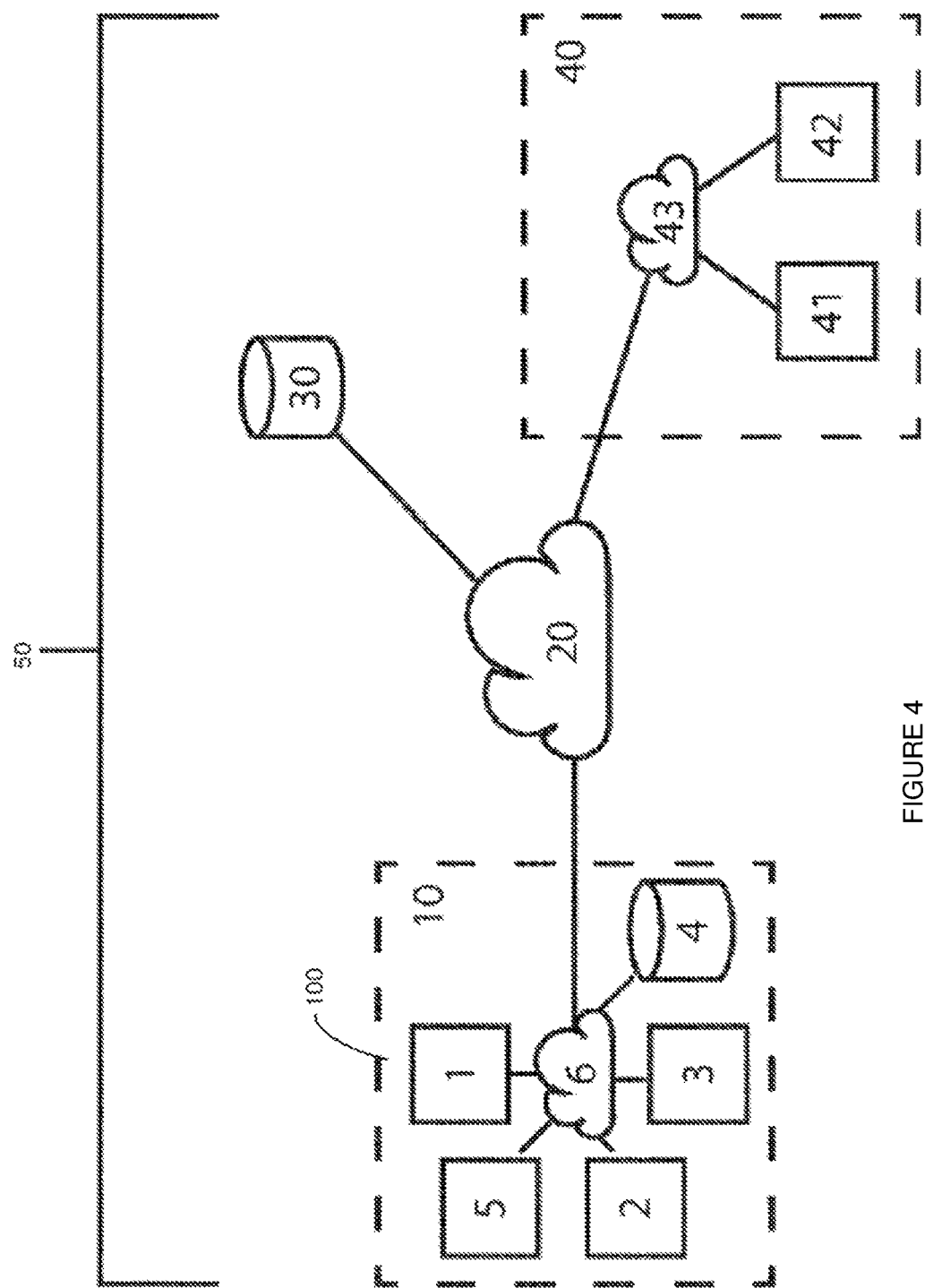
FIG. 4 illustrates an example Artificial Intelligence based cyber security system protecting an example network.

FIG. 4 illustrates an example Artificial Intelligence based cyber security system protecting an example network. The example network of computer systems 50 uses a cyber security appliance 100. The system depicted is a simplified illustration, which is provided for ease of explanation. The system 50 comprises a first computer system 10 within a building, which uses the threat detection system to detect and thereby attempt to prevent threats to computing devices within its bounds.

The first computer system 10 comprises three computers 1, 2, 3, a local server 4, and a multifunctional device 5 that provides printing, scanning and facsimile functionalities to each of the computers 1, 2, 3. All of the devices within the first computer system 10 are communicatively coupled via a Local Area Network 6. Consequently, all of the computers 1, 2, 3 are able to access the local server 4 via the LAN 6 and use the functionalities of the MFD 5 via the LAN 6.

The LAN 6 of the first computer system 10 is connected to the Internet 20, which in turn provides computers 1, 2, 3 with access to a multitude of other computing devices 18 including server 30 and second computer system 40. The second computer system 40 also includes two computers 41, 42, connected by a second LAN 43.

In this exemplary embodiment of the cyber security appliance 100, computer 1 on the first computer system 10 has the electronic hardware, modules, models, and various software processes of the cyber security appliance 100; and therefore, runs threat detection for detecting threats to the first computer system. As such, the computer system includes one or more processors arranged to run the steps of the process described herein, memory storage components required to store information related to the running of the process, as well as a network interface for collecting the required information for the probes and other sensors collecting data from the network under analysis.

The cyber security appliance 100 in computer 1 builds and maintains a dynamic, ever-changing model of the 'normal behavior' of each user and machine within the system 10. The approach is based on Bayesian mathematics, and monitors all interactions, events and communications within the system 10—which computer is talking to which, files that have been created, networks that are being accessed.

For example, computer 2 is based in a company's San Francisco office and operated by a marketing employee who regularly accesses the marketing network, usually communicates with machines in the company's U.K. office in second computer system 40 between 9.30 AM and midday, and is active from about 8:30 AM until 6 PM.

The same employee virtually never accesses the employee time sheets, very rarely connects to the company's Atlanta network and has no dealings in South-East Asia. The security appliance takes all the information that is available relating to this employee and establishes a 'pattern of life' for that person and the devices used by that person in that system, which is dynamically updated as more information is gathered. The model of the normal pattern of life for an entity in the network under analysis is used as a moving benchmark, allowing the cyber security appliance 100 to spot behavior on a system that seems to fall outside of this normal pattern of life, and flags this behavior as anomalous, requiring further investigation.

The cyber security appliance 100 is built to deal with the fact that today's attackers are getting stealthier and an attacker/malicious agent may be 'hiding' in a system to ensure that they avoid raising suspicion in an end user, such as by slowing their machine down.

The cyber security appliance 100 builds a sophisticated 'pattern of life'— that understands what represents normality for every person, device, and network activity in the system being protected by the cyber security appliance 100.

The cyber security appliance 100 can use unsupervised machine learning to works things out without pre-defined labels. In the case of sorting a series of different entities, such as animals, the system analyzes the information and works out the different classes of animals. This allows the system to handle the unexpected and embrace uncertainty when new entities and classes are examined. The modules and models of the cyber security appliance 100 do not always know what they are looking for, but can independently classify data and detect compelling patterns.

The cyber security appliance 100's unsupervised machine learning methods do not require training data with pre-defined labels. Instead, they are able to identify key patterns and trends in the data, without the need for human input. The advantage of unsupervised learning in this system is that it allows computers to go beyond what their programmers already know and discover previously unknown relationships. The unsupervised machine learning methods can use a probabilistic approach based on a Bayesian framework. The machine learning allows the cyber security appliance 100 to integrate a huge number of weak indicators/low threat values by themselves of potentially anomalous network behavior to produce a single clear overall measure of these correlated anomalies to determine how likely a network device is to be compromised. This probabilistic mathematical approach provides an ability to understand important information, amid the noise of the network—even when it does not know what it is looking for.

The cyber security appliance 100 can use a Recursive Bayesian Estimation. To combine these multiple analyzes of different measures of network behavior to generate a single overall/comprehensive picture of the state of each device, the cyber security appliance 100 takes advantage of the power of Recursive Bayesian Estimation (RBE) via an implementation of the Bayes filter.

Using RBE, the cyber security appliance 100's AI models are able to constantly adapt themselves, in a computationally efficient manner, as new information becomes available to the system. The cyber security appliance 100's AI models continually recalculate threat levels in the light of new evidence, identifying changing attack behaviors where conventional signature based methods fall down.

Training a model can be accomplished by having the model learn good values for all of the weights and the bias for labeled examples created by the system, and in this case; starting with no labels initially. A goal of the training of the model can be to find a set of weights and biases that have low loss, on average, across all examples.

An anomaly detection technique that can be used is supervised anomaly detection that requires a data set that has been labeled as "normal" and "abnormal" and involves training a classifier. Another anomaly detection technique that can be used is an unsupervised anomaly detection that detects anomalies in an unlabeled test data set under the assumption that the majority of the instances in the data set are normal, by looking for instances that seem to fit least to the remainder of the data set. The model representing normal behavior from a given normal training data set can detect anomalies by establishing the normal pattern and then test the likelihood of a test instance under analysis to be generated by the model. Anomaly detection can identify rare items, events or observations which raise suspicions by differing significantly from the majority of the data, which includes rare objects as well as things like unexpected bursts in activity.

Development Environment Implementations

In a further aspect of the present disclosure, a cyber security appliance may comprise a development module comprising a plurality of further modules. Some of these modules are exemplified in FIG. 5, which will be discussed further below.

The development module may be configured to provide cyber security services in a software development environment/external code hosting platform. Software development is typically carried out in a distributed manner with the work being coordinated between a plurality of programmers. Elements of source code are written or updated and periodically added to the development project. These changes are usually tracked using version control software, one example of which is Git software. The source code may also be stored on a platform such as a source-code-hosting facility/forge, and where the code is stored alongside corresponding metadata this is sometimes referred to as a code repository.

Examples of Git-based systems include GitHub®, GitLab®, Bitbucket, and SourceForge®; however, to will be appreciated that the present invention could be applied to any Git-based, or similar, system. By applying a cyber security appliance, Artificial Intelligence can be used to extend protection to software development and related version control systems. The Artificial Intelligence based cyber security system can protect against cyber threats trying to penetrate via distributed version control and/or in the source code.

This cyber security protection is enhanced by the applicants appreciation that every developer uploads or commits code to the development environment in a slightly different manner. For example, some developers may commit code in large batches, and others may typically commit small fragments more frequently. The style of the code may also be written in a different manner. Furthermore, it has been appreciated that developers typically work on particular areas of certain software projects/products such that deviations from these areas can be considered abnormal behavior.

An Artificial Intelligence cyber security appliance can be configured to ingest various data of events relating to the software development process, and to process these to detect any anomalous activity or behavior that may correspond to a potential compromise, nefarious actions, or the accidental introduction of vulnerabilities.

Figure 5:
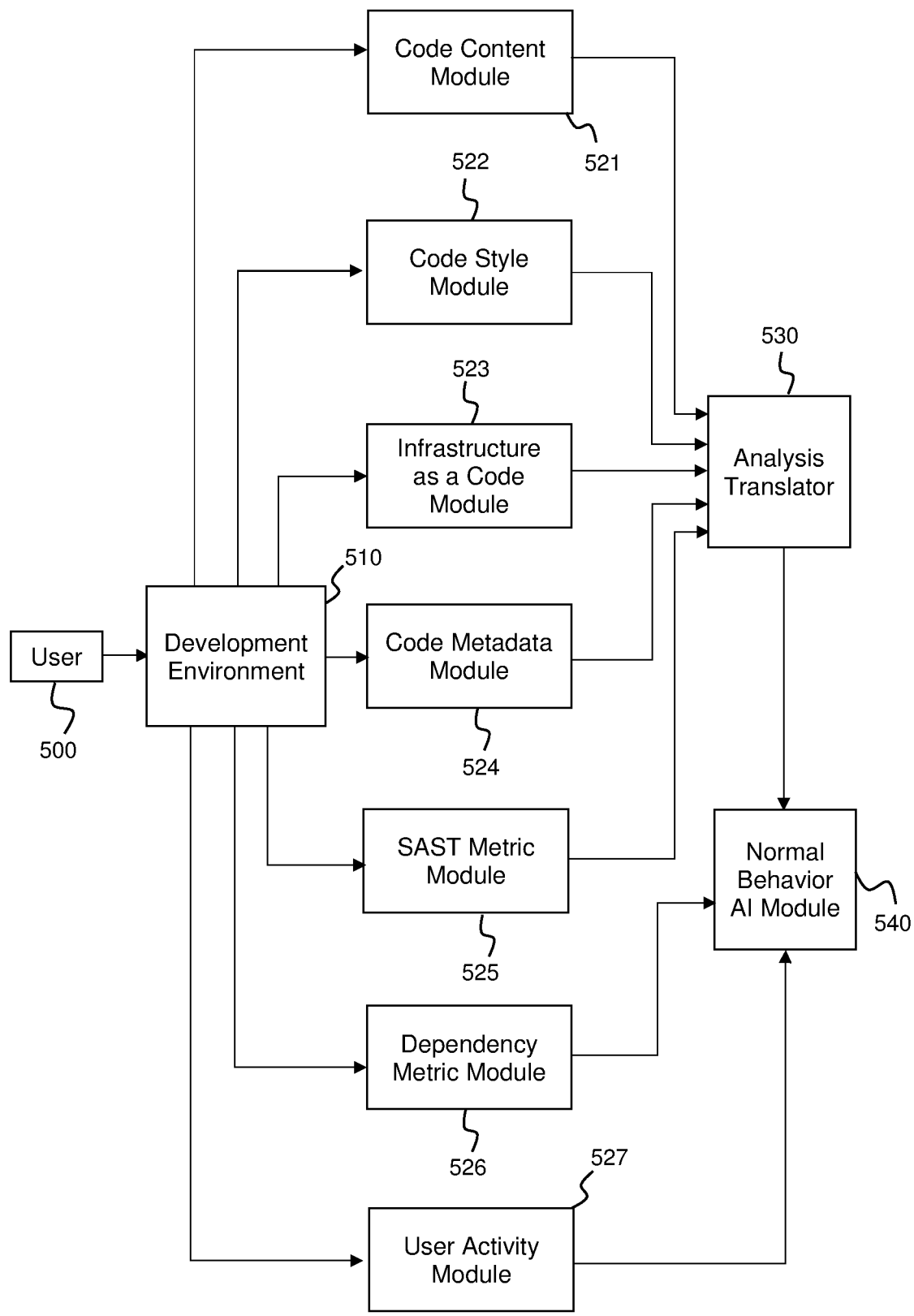
FIG. 5 illustrates a block diagram of an example cyber security appliance interacting with a development environment controlled/operated by a user of a plurality of users.

FIG. 5 illustrates a block diagram of an example cyber security appliance interacting with a development environment 510 controlled/operated by a user 500 of a plurality of users. In the illustrated example, the cyber security appliance comprises a code content module 521, a code style module 522, an infrastructure as a code module 523, a code metadata module 524, a Static Application Security Testing (SAST) metric module 525, a dependency metric module 526, a user activity module 527, an analysis translator 530, and a normal behavior Artificial Intelligence module 540.

It will be appreciated that in alternative embodiments of the cyber security appliance, one or more of the modules inputting into the normal behavior AI module 540 may be omitted and that no single one of these modules is essential for the efficacy of the cyber security appliance.

The user 500 interacts with the development environment to further the development of a software development project, for example by contributing to, or updating, code in the development environment 510. As changes are made, the version control software will add metadata about the changes that are being made, such as who made them, when they were made, and how many lines of source code were changed. This metadata may be stored in audit logs in the development environment. The applicant has appreciated that sources of data such as these may be effective in identifying anomalous behavior that may be indicative malign activity or other potential beaches as will be discussed further below.

The code content module 521, the code style module 522, the infrastructure as a code module 523, the code metadata module 524, and the Static Application Security Testing (SAST) metric module 525 receive, poll, or parse data from the development environment and output resulting information, or metrics, to the analysis translator 530. The analysis translator may then process these metrics/information into a form suitable to be ingested by the normal behavior AI Module 540. The dependency metric module 526 and the user activity module 527 may also receive, poll, or parse data from the development environment and output resulting information, or metrics, to be ingested by the normal behavior AI module 540.

The normal behavior AI module 540 may then be trained to identify normal patterns of activity in the development environment 510 for a particular user 500, or between a group of users, for example a group of users having one or more similar characteristics. The normal behavior AI module 540 may be configured and trained in accordance with the above disclosure in relation to the cyber security appliance 100, for example by using an unsupervised Bayesian mathematical model to detect behavioral change in the activity in the development environment 510. By learning this normal pattern of life/activity in the development environment, the normal behavior AI module 540 may be able to identify activity that is abnormal, which may be indicative of malicious activity in the development environment and require investigative action and/or appropriate remediation to resolve any impact of the malicious activity.

Code Content Module

The code content module 521 may be configured to analyze new or modified source code uploaded/committed to the code repository of the development environment. In particular, the code content module 521 may comprise an AI having a machine learning model trained to classify the source code committed (or subsections thereof) as likely being directed to one or more of a plurality of labels. In particular, the code content module 521 may be configured to analyze the source code to determine if there are any elements in the code that can be classified as a certain type so that this classification data can then be fed into the normal behavior AI module 540.

The machine learning model of the code content module 521 may be implemented using one or more of a variety of machine learning methods. In one example, the code content module 521 uses natural language processing to perform the labelling/classification of the source code. This may be achieved using neural networks (e.g. statically trained neural networks), or alternatively a supervised machine learning transformer classifier. These machine learning methods may be trained (for example using supervised learning with manual labelling) to identify the likelihood that a piece of source code can be associated with one or more of a plurality of labels.

The training in this regard can be fairly generic as it is not necessary for the predication to be spot on every time, but rather to identify a good assumption for the rough genre of code being committed, that can produce a prediction over a wide variety of code without overfitting. In this manner, the training may be continued until the increase in accuracy of the trained machine learning model begins to level off.

In one example, these labels may include labels indicating that the code includes operating system level commands (such as remove, move, list, or make), or whether there are external connectivity commands, or whether there are database query commands, etc. By training the machine learning model of the code content module 521 with training source code data labelled in this manner, the trained code content module 521 may be able to output an indication of the likelihood that a segment of code being analyzed contains commands relating to one of the trained labels. In this manner, the type of code that has been committed by a user and the broad function that the code might have/genre it may relate to may be identified and subsequently input to the normal behavior AI module 540.

It will be appreciated that many different known natural language processing methods could be selected to undergo supervised training on appropriately labelled training data in order to fulfil this function.

In one example, external request based code that is implemented over HTTP may include many instances of words like "TCP", or "UDP"; and when implemented using REST Application Programming Interfaces may include many instances of words like "get", or "post", or "delete". Accordingly, by labeling such code as external request based code and running supervised training in the machine learning model of the code content module 521, the module can be taught to identify further source code excerpts that may also relate to external request based code.

In a further example, a section of source code may utilize a request library, where the underlying package is configured to make HTTP requests out. For example, the package may be a urllib in the context of Python. This is a low level command that may not be expected in many aspects of a projects coding; however, these commands may be included in a low level dependency library. This may be indicative that the committed code has imported a library that incorporates a wide variety of low level commands. While the import of the library may have been intentional and by a trustworthy developer so that a certain portion of the library could be used to achieve a desired action; the remainder of the library and low level commands may not be required. This may unintentionally introduce a vulnerability into the source code by providing unnecessary low level commands that could be taken advantage of in the final build of the project by a malicious actor.

If a portion of source code did not previously provide any external connectivity, but a recent commit has added this functionality for the first time, then this may be output by the code content module 521 for ingestion by the normal behavior AI module 540, which may be configured to determine whether this is considered to be anomalous behavior. This may represent the introduction of an unintended ability for the export/exfiltration of data from a storage object to an external database when only the internal transfer of data is intended and utilized by the code.

Code Style Module

The code style module 522 may also be configured to analyze new or modified source code uploaded/committed to the code repository of the development environment. In particular, the code style module 522 may consider the type of source code that a given user normally commits as well as metrics relating to the quality of that source code and languages used, for example in any annotations. The impact of this module in the cyber security appliance is that individual developers will typically have a particular style that they have picked up in how they write an annotate code, as well as the type of code that they work on.

By outputting this data for ingestion by the normal behavior AI module 540, the code style analyzer may enable the normal behavior AI module 540 to learn the typical style of a given developer such that it can be identified if this style changes at a particular point in time. This may be an indication that someone other than the given developer was behind the source code that had been committed, i.e. a third-party may have committed source code in the name of the given developer, for example by compromising the given developer's machine/work environment (which may be cloud based in some examples).

As such, this change in style may be an indication that the given developer and/or the committed source code has been compromised and action may be required to remedy this as well as any vulnerabilities in the source code. Remediation action will be discussed in further detail below.

It is important to note that this change in style need not be evidenced as a reduction in a metric of quality of the source code being committed by the particular developer, the applicant has appreciated that sudden changes in style that may be considered an improvement may also be indicative of compromise and the potential for associated vulnerabilities.

The code style module 522 may poll existing metrics in this regard from the development environment, for example from tools built into the source code hosting platform of the development environment. Alternatively or additionally, the code style module 522 may review the source code itself and produce static metrics, for example by counting the number of comments that are in each file committed by a given developer, or identifying the level of documentation present.

Further examples of existing metrics for code style may include code size (for example the number of lines of code in a committed file), code cohesion (i.e. how strongly the responsibilities within a piece of code are related—for example, is it directed to just one task, or does it include various functional components), Cyclomatic complexity, and inheritance hierarchies (for example the number of different classes, stemming from a base class, that inherit from one another—wherein a low level of inheritance hierarchy indicates good code that is likely to be more resilient). It will be appreciated that this list of known code style metrics is non-exhaustive and that other metrics may be used in connection with the present invention.

Alternatively, these and other code style metrics could be determined by a further AI having a machine learning model comprised within the code style module 522 and trained to determine the likely value of such metrics. In one example, this could be implemented using natural language processing.

Infrastructure as a Code Module

The infrastructure as a code module 523 may be configured to identify source code fragments relating to infrastructure as a service (IaaS) commands (e.g. Terraform commands or Kubernetes manifest files) and to ingest these from the development environment/source code repository. These infrastructure as a service/code commands constitute a declarative configuration language that is used to define the infrastructure that is to be provided as a service, and may manage and provision the infrastructure to be used by the software being developed using code defining the type of infrastructure required.

Such IaaS files are typically stored on the source code repository in a similar manner to the software source code itself and thus can be parsed directly from the source code repository.

The infrastructure as a code module 523 may also ingest the corresponding audit logs that are generated in cloud environments of the development environment when the actual IaaS entities are deployed from the templates (e.g. audit logs identifying the initialization of these resources by the terraform actions). The post-deployment interaction of service accounts, which have been created by these infrastructure-as-code instructions, with other resources in the environment may also be seen via such audit logs. These audit logs may enable the past point in time that the cloud infrastructure was created to be determined by analyzing the references to the automated services/user behavior identified in the audit logs. Based on this, further audit logs can be retrieved to determine the nature of the cloud computing instances that already exist and the associated databases that have been created.

For a virtualized environment, it can be expected that the infrastructure as a code module 523 would be able to see the network traffic in containerized environments. Where the network behavior is visible, this can then be aggregated and analyzed to identify connections and relevant IP addresses.

Resource enumeration code can also be polled to identify the components of the cloud platform, for example the host name that it exists under, the IP address that it is operating under, etc. By combining monitored data using common IP addresses, it is possible to identify what resources there are in the environment, what is being monitored, and any additions to the environment as and when they occur.

In one example, the code may provision a machine configured with a certain number of processing cores and a certain amount of memory in a certain virtual private cloud that can communicate with certain other components. By analyzing such code, it can for example be determined whether the code creates cloud resources having an object container/bucket that is open to public inspection, or creates a database that is available to a Lambda service that would not have been expected in a certain project type, or represent a risk of vulnerability by their presence.

This can be achieved by parsing the code and using static analysis logic to determine what additional communication paths have been defined. By considering background knowledge of the environment that is being added to (i.e. the existing interconnections that have been defined previously), it can be determined how deeply into the system a new component that is externally accessible can reach.

Where the IaaS has already been setup, the probe module of the cyber security appliance 100 can be used to interact with entities in, for example, a cloud infrastructure environment that may include one or more cloud infrastructure entities reliant on packet transmission (including but not limited to Containers, Virtual Machines etc.). The infrastructure as a code module 523 may utilize the probes to interact, whether by API interaction, accessing user/audit/event logging tools, ingesting network traffic, and/or making relevant requests. The probes then feed information about relevant changes in, for example, the cloud infrastructure environment back to the modules and data store in a central location of the cyber security appliance.

The infrastructure as a code module 523 can maintain the privacy of the user data or the third-party event data. The infrastructure as a code module 523 can be configured through the probes to harvest both metadata and other data detailing the administrative event, network data, etc., leaving the actual contents of the file or resource undisturbed.

A variety of approaches may be used to retrieve data from a third-party operator Software as a Service (SaaS) service, a cloud device including its virtual machines, administrative logs, and other raw data sources. As such, the probe connectors can be configured based on the specifications of that specific raw data source. For security purposes, the cyber security appliance 100 may prefer that the probe connectors control the data transfer. However, in some instances, the raw data source (itself) may initiate the data transmission to the probes and eventually to the cyber security appliance.

U.S. non-provisional patent application titled "Cyber security appliance for a cloud infrastructure", filed Feb. 19, 2019, Ser. No. 16/278,982, and U.S. non-provisional patent application titled "Incorporating software-as-a-service data into a cyber threat defense system", filed Feb. 19, 2019, Ser. No. 16/278,991 describe further means for probing and analyzing the configuration of and activity in IaaS and SaaS environments respectively, the content of each of which is incorporated herein by reference in its entirety.

The above code content module 521, code style module 522, and infrastructure as a code module 523 each require access to the source code itself in order for the respective analysis to be performed by these modules. However, this does not require this source code to leave the network/domain under control of the developer entity as these components can be implemented within the pipeline of the development environment in some embodiments, such that the modules run locally while the code is analyzed in place.

Code Metadata Module

When files are committed to the development environment, there will be certain metadata associated with the committed file, for example the file will be added to a particular location within the source code repository and it will have a particular file name. The code metadata module 524 may be configured to extract a plurality of metrics from this metadata, for example, the directory structure location of the committed file may be extracted and used as a metric, including both the filename itself and text of those directory names as one or more metrics. Further examples include the text of the commit message used by the developer (this may be the number of characters in the commit message text or another style metric), the time of day that the file was committed, the number of files that were modified by the commit, the mimetype, the file extension, the file size, and the number of lines of source code changed by the commit. The text of the file itself may also be used as a metric.

The code metadata module 524 may further be configured to review this metadata with the aim of inferring the kind of file that has been committed and the general intention behind committing it. For example, if the metadata shows that a file was last updated a long time before it was committed to the project, then it is likely that that file was not intended to be committed, but rather has accidentally been included with some other files committed at the same time. The code metadata module 524 may also consider the time that a particular file was created with respect to the timeline of the project as a whole—certain kinds of files may typically be committed at certain points in time during the development of the project and so this may also be input into the normal behavior AI module.

This analysis of the kind of file being committed and other file metadata may be implemented using an off-the-shelf natural language processor component, which may also be pre-trained for this analysis.

SAST Metric Module

The Static Application Security Testing (SAST) metric module 525 may be configured to identify portions of source code that include common vulnerabilities, for example outdated packages, unverified responses to requests (e.g. not verifying the self-certificate of an External Service). Source code repositories typically have SAST metric tools built in and accordingly the SAST metric module 525 may receive, poll, or parse this metric data from the tools built into the source code hosting platform of the development environment, for example by using an API.

Alternatively or additionally, the SAST metric module 525 may review the source code itself and produce SAST metrics using known methods.

The resulting metric information may then be output to the analysis translator 530 for further processing.

Analysis Translator

The analysis translator 530 may be configured to receive metrics and other information from the code content module 521, the code style module 522, the infrastructure as a code module 523, code metadata module 524, and the Static Application Security Testing (SAST) metric module 525. These metrics and other information may then be processed by the analysis translator 530 to place this information in a common/normalized format that can be ingested by the normal behavior AI module 540, if this has not already taken place at the respective modules.

This common format may be a statement or message combining one or more information points received at the analysis translator for a given point in time. For example, stating that a particular user has committed a new code fragment at a particular time, with the code having certain style characteristics and seeming to contain OS level commands. This can reduce the number of individual information points being inputted into the normal behavior AI module 540 to provide further context between the constituent information points and avoid overloading the normal behavior AI module 540.

A consistent series of these messages can then be ingested and monitored by the normal behavior AI module 540 to track the normal behavior for the user and identify any activity that stands out.

Dependency Metric Module

When source code is created in a code repository with the use of external libraries, the source code will depend on those external libraries; however, those external libraries may in turn have dependencies on further external libraries/content such that a large/deep branching dependency structure is created for the source code. Existing tools are able to identify these dependencies and the overall structure, but they do not give any context as to what this means in practical reality.

The dependency metric module 526 provides such context by identifying the kind of dependency (for example whether the dependency introduces code making an external request or communicating with one or more databases).

The audit log of the source code repository would show that a particular user had modified a dependencies file. The cyber security appliance can then compare the source code files before and after the change to identify which dependency has been added/modified and to consider what the dependency involves, for example, does it relate to the access of a database, or some form of external request?

This contextual data is then fed into the normal behavior AI module 540 using a common format/string, such as "User X added dependency to project Y". By monitoring and learning this behavior over time, the role and actions of User X can be determined by the normal behavior AI module 540. On this basis, a commit that subsequently adds an unexpected new dependency can then be identified by the normal behavior AI module 540 as being anomalous.

For example, a junior developer with a low level of experience would not be expected to be adding low level database dependencies to a project. It may also be considered whether the type of dependency added is common for a project of that type. In this manner, new dependencies that would not be expected to be added by User X can be identified and flagged for further review.

In a further example, the dependency metric module 526 may build a representation of all of the dependencies in a given project, for example using a tree data structure. This tree data structure can be built up by analyzing what dependencies are in the project, whether are previous dependencies are now out of date and should be removed, whether new dependencies have been added. If an audit log polled from the development environment 510 indicated that something had been changed and that this affected a dependencies file (for example a package lock file in the context of a JavaScript environment node.js, or a policy lock file/pip file in the context of Python), then the dependency metric module 526 may further poll metrics from static analysis tools built into the source code repository of the development environment. Alternatively, the dependency metric module 526 may review the relevant dependencies file(s) and interpret them using their standard format to determine what is included in the dependencies file and what additional dependencies have been included.

User Activity Module

The user activity module 527 may collate various information about the activity of an individual user/developer in the development environment by polling the audit logs compiled by the source code repository of the development environment. For example, this may include the timing of commits being uploaded to the source code repository, an approximate location that the commit was made from (using IP addresses for example). By reviewing this data over time, statistics for the activity of the user can be built up, for example the regularity with which the user uploads commits, the time of day/week that they usually upload commits, how much code is typically committed at any one point in time.

These data points can then be input into the normal behavior AI module 540 to use machine learning to build up a picture of the normal behavior/pattern of life for that user's interaction with the source code repository of the development environment.

Further aspects of the user's interaction with the development environment may also be taken into account, making use of connections between Software-as-a-Service (SaaS) services, and between local services. For example an analysis of the user's workstation, including the timing of logins to the workstation, and unusual traffic; unusual phone activity; usage of email systems, including outgoing email activity and the type of emails received; internet browsing history; and productivity software usage and configuration. By gathering together the context of all of these types of interactions, an individual user may be able to be matched between different services. By linking a user/developer in these environments in this manner, potential compromises detected in those environments can be used to inform how actions in the source code repository are viewed and managed.

A SaaS application licenses a software application to a user on a periodic basis, such as Microsoft 365, Salesforce.com, Dropbox.com, Box.com and the Google Workspace. The added benefit of these applications is that the SaaS developer centrally hosts the functions of the application. The SaaS application can leverage this centralized hosting to expand the functionality of the SaaS application beyond the capabilities of a single user device. However, as the hosting is controlled by a third-party, the centralized hosting renders accessing performance data more difficult. Unlike with a cloud service, a third-party platform monitors and controls any traffic with the SaaS application, preventing a cyber security appliance from directly monitoring the network traffic. However, the cyber security appliance can access an appropriate behavioral data application programming interface (API) to access logs that expose every action that occurs within the SaaS environment. Thus, the cyber security appliance, using a self-learning attack detection system, can operate across the entirety of an on-premise or cloud digital networks, as well as across any SaaS facilities used in an organization. Thus, the cyber threat defense system can access all the computing, networks and devices that can be found in company properties, as well as rented cloud facilities and SaaS services.

Using the cyber threat module, the cyber security appliance learns the normal "pattern of life" of all communications-network-connected elements of an on-premise and remote digital ecosystem. Further, the cyber threat defense system can use a SaaS module to learn the interactions of the user with data and services within the SaaS services, referred to as administrative events. For example, the SaaS module can detect when a user reads a file, shares a file, starts a server, deletes a server, sends an email, and other actions. Once "normal behavior" has been learned, the cyber threat defense system is capable of identifying unexpected or unusual behaviors from devices, software, or operators of devices and SaaS services.

Such unusual behavior might be a result of misconfiguration, accidental use, malicious use by a legitimate operator, or malicious use by a third-party. The SaaS immune system has no prior assumptions and is capable of learning about the behavior of any device or person in on-premise environments, remote environments, and even third-party environments. The cyber security appliance uses many different machine learning and artificial intelligence techniques that compete to learn the best possible pattern of life for individual devices or people, as well as subsets of their behavior.

The cyber security appliance can learn the similarities of behavior in groups of people and devices. The cyber threat defense system can cluster these groups to develop a baseline of "normal behavior" across the group. The cyber threat defense system can then recognize when a person or device is in the cluster is deviating from this "normal behavior".

The cyber security appliance can present its summarized findings and enable further human investigation into the unusual behavior to determine whether this behavior represents an actual attack. If an attack is indicated, then this potential/likely compromise can be used to inform the potential compromise of code in the software development environment.

In an embodiment, the cyber security appliance is configured to operate across the entirety of the SaaS environment and traditional computing mechanisms in an organization. For example, the cyber security appliance can incorporate the oversight of data accesses, data sharing, and data changes in third-party hosted SaaS applications, such as Salesforce®, Dropbox®, Microsoft 365®, as well as the traditional corporate facilities found in offices and datacenters.

In one example, user hierarchy data may be able to be pulled from software configuration, such as productivity software, and used to identify which users are in the same group/team, which users are considered to be more or less senior than others, etc. This may then be used to further contextualize the behavior of users for feeding into the normal behavior AI module 540, for example, a more senior developer may be considered to be more trusted to work in outbound externally interfacing aspects of the code than a more junior developer.

U.S. non-provisional patent application titled "Cyber security for software-as-a-service factoring risk", filed Feb. 26, 2021, Ser. No. 17/187,169 describe further means for identifying users associated with event data based on contextual user data to track them across multiple platforms, the content of which is incorporated herein by reference in its entirety.

Normal Behavior AI Module

The output of the analysis translator 530 (summarizing the outputs of the code content module 521, the code style module 522, the infrastructure as a code module 523, the code metadata module 524, and the Static Application Security Testing (SAST) metric module 525), the dependency metric module 526, and the user activity module 527 are input into the normal behavior AI module 540.

At its core, the normal behavior AI module 540 mathematically characterizes what constitutes 'normal' behavior based on the analysis of the large number/set of different measures received from the respective modules through unsupervised machine learning methods as described in relation to the cyber security appliance above. The cyber threat defense system can build a sophisticated 'pattern of life'— that understands what represents normality for each user/developer interacting with the development environment. This 'pattern of life' for that user is dynamically updated as more information is gathered. As such, the 'normal' model is used as a moving benchmark, allowing the system to spot behavior on a system that seems to fall outside of this normal pattern of life and to flag this behavior as anomalous, requiring further investigation or remedial actions, which in some cases may be automated.

The core threat detection system may be a 'Bayesian probabilistic' system. The Bayesian probabilistic approach can determine periodicity in multiple time series data and identify changes across single and multiple time series data for the purpose of anomalous behavior detection. The normal behavior AI module's unsupervised machine learning methods do not require training data with pre-defined labels. Instead, unsupervised machine learning methods may identify key patterns and trends in the data, without the need for human input. In this manner, the threat detection system can self-learn and detect normality in order to spot true anomalies, allowing organizations of all sizes to understand the behavior of users and machines on their networks at both an individual and group level. Monitoring behaviors, rather than using predefined descriptive objects and/or signatures, means that more attacks can be spotted ahead of time and extremely subtle indicators of wrongdoing can be detected. Unlike traditional legacy defenses, a specific attack type or new malware does not have to have been seen first before it can be detected.

The I/O module may cause alerts and/or events forming the chain of behavior onto a user interface with at least three-dimensions of i) a horizontal axis of a window of time, ii) a vertical axis of a scale indicative of the threat risk assigned for each alert and/or event in the chain and a third dimension of iii) a different color for the similar characteristics shared among the individual alerts and events forming the distinct item of the chain. The different color may be red, blue, yellow, or others. For gray scale, the user interface may use different shades of gray, black, and white with potentially different hashing patterns. These similarities of events or alerts in the chain may be, for example, alerts or events are coming from same device, same user credentials, same group, same source identifiers, same destination Internet Protocol addresses, same types of data transfers, same type of unusual activity, same type of alerts, same rare connection being made, same type of events, or others, so that a human can visually see what spatially and content-wise is making up a particular chain rather than merely viewing a textual log of data. Note, once the human mind visually sees the projected pattern and corresponding data, then the human can ultimately decide if a cyber threat is posed. Again, the at least three-dimensional projection helps a human synthesize this information more easily. The visualization onto the user interface allows a human to see data that supports or refutes why the cyber threat defense system thinks these aggregated alerts or events could be potentially malicious. Also, instead of generating the simple binary outputs 'malicious' or 'benign,' the cyber threat defense system's mathematical algorithms produce outputs that indicate differing degrees of potential compromise.

Previous tools for managing cyber security in source code simply output long lists of potential errors in the code. As these long lists include many minor inaccuracies, it is typically not possible to review all of the potential issues identified and this means that more serious vulnerabilities can remain and be included in the published version of the project.

The applicant has appreciated that such systems can be improved by considering the context of the actions that make up the code development process, at the level of each commit to a code repository. In this manner, the systems of the present application may consider aspects such as which user is committing the code in question, what is the function of this code vs the type of area that the developer usually works on, and is there anything else in the developers actions in other environments/software services that may indicate a potential compromise such that code committed within a given timeframe should be scrutinized more closely. As discussed above, each module providing information input for the normal behavior AI module 540 may be considered to be a different building block that contributes to the building up of a picture of the activity of a particular user. Combining these building blocks improves the accuracy of the picture obtained, but no one block is considered essential for the process to identify anomalous behavior that may be considered to be above a threshold such that action is required.

This action may include steps such as temporarily revoking a user's permissions to commit code to a branch, protecting the branch in question from edits from any user, revoking cloud infrastructure user permissions for the user in question as a whole, and potentially rolling back the state of code that has recently been committed to by the user to a state prior to this commit. In some embodiments, these actions could be performed autonomously via automated API commands in order to mitigate further potential damage until the situation can be reviewed in further detail.

In this manner, the present disclosure may enable a cyber security appliance to gain an awareness of the development of the code on the code repository and of an associated development operations ecosystem so that the cyber security appliance can identify when a user is doing something anomalous or unusual and trigger some kind of action from that. This is possible because the pattern of life learning effectively identifies when something doesn't look right, rather than attempting to identify specific instances of bad code that would introduce a vulnerability of a certain severity. This in turn enables the present disclosure to provide an increased probability of capturing supply chain attacks and misconfigurations while in progress rather than after the fact. Static code analysis by itself is not sufficient to understand a point of compromise and when these kind of vulnerabilities are introduced. Attacks are typically designed to be imperceptible, and so it may only be when the context of whether the particular user would have been expected to be doing something in this area that malicious activity by the user, or a third-party (for example via a compromised device) may be identified.

The system covers both intentional malign activity, as well as accidental misconfiguration that might lead to security vulnerabilities, e.g. a wrong low level dependency in the code written.

By performing this wider contextual analysis, the point of compromise can be determined more accurately, which in turn allows more precision in the remedial actions implemented. For example, once a detection threshold of actionable abnormal activity has been exceeded, it may be revealed that further low level (below an actionable threshold) abnormal activity had been occurring for a set duration prior to the eventual point at which the threshold was exceeded. Accordingly, the system may roll back the code to a point in time further in the past that includes additional commits of code from the user in question, the security of which may have been brought into question.

The method and system are arranged to be performed by one or more processing components with any portions of software stored in an executable format on a computer readable medium. Thus, any portions of the method, apparatus and system implemented as software can be stored in one or more non-transitory memory storage devices in an executable format to be executed by one or more processors. The computer readable medium may be non-transitory and does not include radio or other carrier waves. The computer readable medium could be, for example, a physical computer readable medium such as semiconductor memory or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

A cloud provider platform may include one or more of the server computing systems. A cloud provider can install and operate application software in a cloud (e.g., the network such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser based applications, 3) the request and response cycle from a dedicated on-line server, 4) the request and response cycle directly between a native application resident on a client device and the cloud-based remote access to another client computing system, and 5) combinations of these.

Computing Devices

Figure 6:
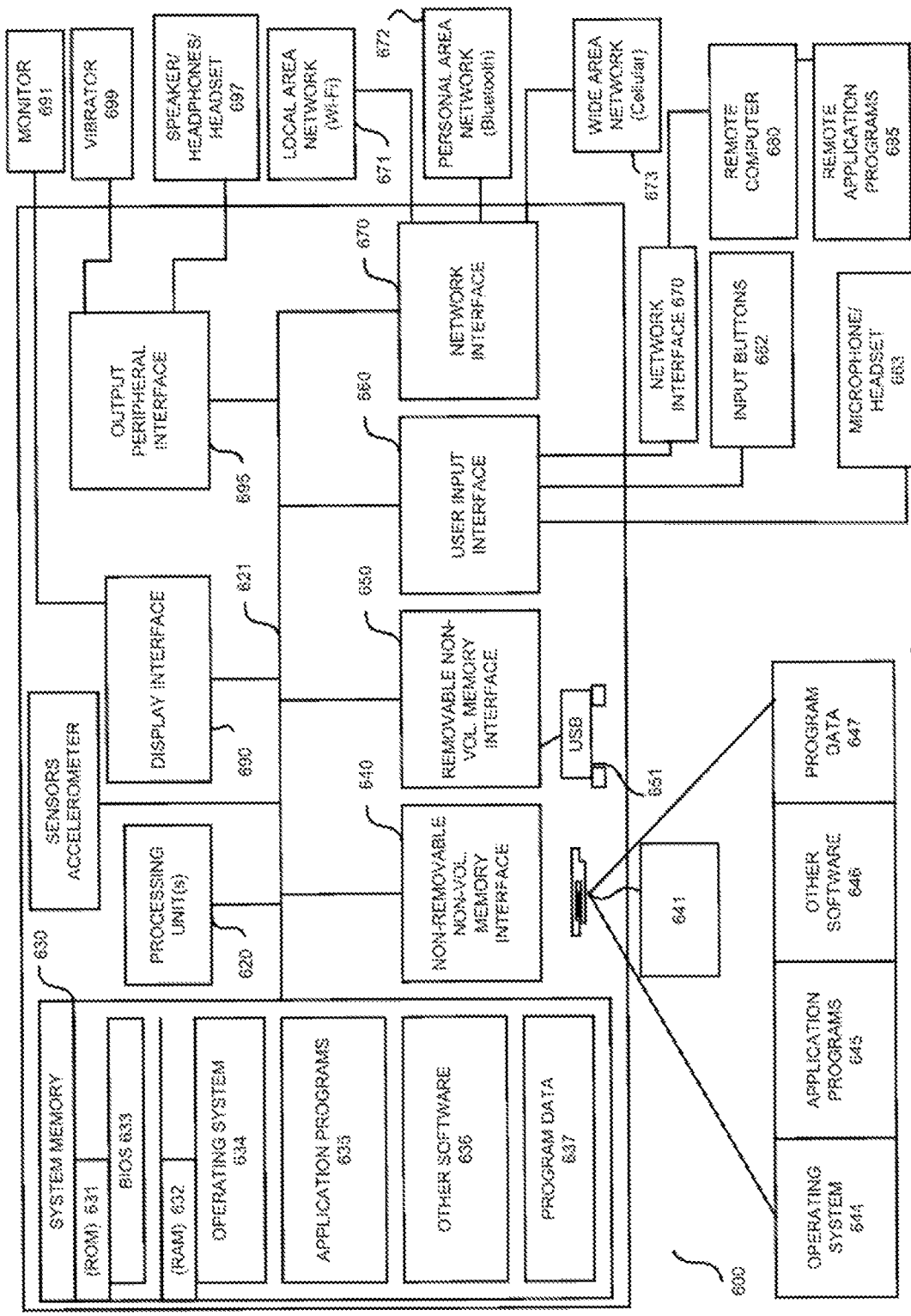
FIG. 6 illustrates a block diagram of an embodiment of one or more computing devices that can be a part of an example Artificial Intelligence based cyber security system.

FIG. 6 illustrates a block diagram of an embodiment of one or more computing devices that can be a part of the Artificial Intelligence based cyber security system for an embodiment of the current design discussed herein.

The computing device may include one or more processors or processing units 620 to execute instructions, one or more memories 630-632 to store information, one or more data input components 660-663 to receive data input from a user of the computing device 600, one or more modules that include the management module, a network interface communication circuit 670 to establish a communication link to communicate with other computing devices external to the computing device, one or more sensors where an output from the sensors is used for sensing a specific triggering condition and then correspondingly generating one or more preprogrammed actions, a display screen 691 to display at least some of the information stored in the one or more memories 630-632 and other components. Note, portions of this design implemented in software 644, 645, 646 are stored in the one or more memories 630-632 and are executed by the one or more processors 620. The processing unit 620 may have one or more processing cores, which couples to a system bus 621 that couples various system components including the system memory 630. The system bus 621 may be any of several types of bus structures selected from a memory bus, an interconnect fabric, a peripheral bus, and a local bus using any of a variety of bus architectures.

Computing device 602 typically includes a variety of computing machine-readable media. Machine-readable media can be any available media that can be accessed by computing device 602 and includes both volatile and non-volatile media, and removable and non-removable media. By way of example, and not limitation, computing machine-readable media use includes storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 602. Transitory media such as wireless channels are not included in the machine-readable media. Machine-readable media typically embody computer readable instructions, data structures, and other executable software.

In an example, a volatile memory drive 641 is illustrated for storing portions of the operating system 644, application programs 645, other executable software 646, and program data 647.

A user may enter commands and information into the computing device 602 through input devices such as a keyboard, touchscreen, or software or hardware input buttons 662, a microphone 663, a pointing device and/or scrolling input component, such as a mouse, trackball or touch pad 661. The microphone 663 can cooperate with speech recognition software. These and other input devices are often connected to the processing unit 620 through a user input interface 660 that is coupled to the system bus 621, but can be connected by other interface and bus structures, such as a lighting port, game port, or a universal serial bus (USB). A display monitor 691 or other type of display screen device is also connected to the system bus 621 via an interface, such as a display interface 690. In addition to the monitor 691, computing devices may also include other peripheral output devices such as speakers 697, a vibration device 699, and other output devices, which may be connected through an output peripheral interface 695.

The computing device 602 can operate in a networked environment using logical connections to one or more remote computers/client devices, such as a remote computing system 680. The remote computing system 680 can a personal computer, a mobile computing device, a server, a router, a network PC, a peer device or other common network node, and typically includes many or all of the elements described above relative to the computing device 602. The logical connections can include a personal area network (PAN) 672 (e.g., Bluetooth®), a local area network (LAN) 671 (e.g., Wi-Fi), and a wide area network (WAN) 673 (e.g., cellular network). Such networking environments are commonplace in offices, enterprise-wide computer networks, intranets and the Internet. A browser application and/or one or more local apps may be resident on the computing device and stored in the memory.

When used in a LAN networking environment, the computing device 602 is connected to the LAN 671 through a network interface 670, which can be, for example, a Bluetooth® or Wi-Fi adapter. When used in a WAN networking environment (e.g., Internet), the computing device 602 typically includes some means for establishing communications over the WAN 673. With respect to mobile telecommunication technologies, for example, a radio interface, which can be internal or external, can be connected to the system bus 621 via the network interface 670, or other appropriate mechanism. In a networked environment, other software depicted relative to the computing device 602, or portions thereof, may be stored in the remote memory storage device. By way of example, and not limitation, remote application programs 685 as reside on remote computing device 680. It will be appreciated that the network connections shown are examples and other means of establishing a communications link between the computing devices that may be used.

It should be noted that the present design can be carried out on a computing device such as that described with respect to FIG. 6. However, the present design can be carried out on a server, a computing device devoted to message handling, or on a distributed system in which different portions of the present design are carried out on different parts of the distributed computing system.

Note, an application described herein includes but is not limited to software applications, mobile applications, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, Java, HTTP, or other similar languages. Also, an algorithm can be implemented with lines of code in software, configured logic gates in hardware, or a combination of both. In an embodiment, the logic consists of electronic circuits that follow the rules of Boolean Logic, software that contain patterns of instructions, or any combination of both. A module may be implemented in hardware electronic components, software components, and a combination of both.

Generally, an application includes programs, routines, objects, widgets, plug-ins, and other similar structures that perform particular tasks or implement particular abstract data types. Those skilled in the art can implement the description and/or figures herein as computer-executable instructions, which can be embodied on any form of computing machine-readable media discussed herein.

Many functions performed by electronic hardware components can be duplicated by software emulation. Thus, a software program written to accomplish those same functions can emulate the functionality of the hardware components in input-output circuitry.

Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

The invention claimed is:

1. A method for a cyber security appliance incorporating data from a source code repository, hosted by a software development environment, to identify cyber threats related to source code being stored and developed in that source code repository, the method comprising:
   receiving data indicating a network entity representing a user's interaction with the source code repository by one or more modules of the cyber security appliance including at least a Static Application Security Testing (SAST) metric module executable by a processor, wherein the data including one or more SAST metrics relating to a portion of new or modified source code uploaded to the source code repository;
   providing the data including the SAST metrics provided to one or more machine learning models trained on a normal benign behavior interacting with the source code repository using a normal behavior benchmark describing parameters corresponding to a normal interaction behavior;
   identifying whether the data indicating the network entities interaction with the source code repository corresponds to behavior that deviates from the normal benign behavior;
   identifying whether a threshold level of deviation from the normal benign behavior has been exceeded; and
   if the threshold level of deviation from the normal benign behavior has been exceeded, determining that a cyber threat may be present and executing an autonomous response to restrict the network entities interaction with the source code repository.

2. The method of claim 1, wherein the normal behavior benchmark describes parameters corresponding to a normal interaction behavior of the user represented by the network entity.

3. The method of claim 1, wherein the autonomous response may comprise one or more of: revoking cloud infrastructure user permissions for the user, temporarily revoking the user's permissions to update code stored in the source code repository, temporarily locking the editing of an affected portion of a portion of source code by any user, and reverting the affected source code stored in the source code repository to a prior version.

4. The method of claim 3, further comprising comparing a threat risk parameter listing a set of values describing aspects of the cyber threat to a benchmark matrix having a set of benchmark scores to determine the nature of the autonomous response to be executed.

5. The method of claim 1, wherein the data indicating the network entities interaction with the source code repository comprises audit log data and/or other metadata.

6. The method of claim 1, further comprising receiving portions of new or modified source code uploaded to the source code repository at a code content module of the one or more modules of the cyber security appliance, and classifying the portions of source code with one of a plurality of labels using a trained machine learning model of the code content module.

7. The method of claim 6, wherein the plurality of labels indicate a type or genre of functionality that the portion of source code is likely to be directed to.

8. The method of claim 6, wherein the classification is performed using one of a statically trained neural network, or a supervised machine learning transformer classifier.

9. The method of claim 1, further comprising receiving, at a code style module of the one or more modules of the cyber security appliance, one or more code style metrics of a portion of new or modified source code uploaded to the source code repository, and communicating this to the one or more machine learning models trained on a normal benign behavior interacting with the source code repository.

10. The method of claim 9, wherein the one or more code style metrics of the portion of new or modified source code comprises one or more of a number of lines of code, a code annotation language, a code cohesion metric, the Cyclomatic complexity, and an inheritance hierarchy.

11. The method of claim 9, wherein the one or more code style metrics are ingested from the software development environment.

12. The method of claim 1, further comprising receiving portions of new or modified code uploaded to the source code repository at an infrastructure as a code module of the one or more modules of the cyber security appliance, and performing, at the infrastructure as a code module, a static analysis on the code to identify infrastructure as a code instructions, to determine the type of infrastructure to be enumerated thereby, and what each item of infrastructure can communicate with.

13. The method of claim 1, further comprising receiving code metadata corresponding to portions of new or modified source code uploaded to the source code repository at a code metadata module of the one or more modules of the cyber security appliance, and to infer a type and an intention corresponding to the portions of new or modified source code.

14. The method of claim 1, wherein the SAST metrics include portion of source code including common vulnerabilities.

15. The method of claim 1, further comprising receiving metrics and other information from the one or more modules of the cyber security appliance, processing these metrics and other information to output a normalized string, and communicating this normalized string to the one or more machine learning models trained on a normal benign behavior interacting with the source code repository.

16. The method of claim 1, further comprising receiving, at a dependency metric module of the one or more modules of the cyber security appliance, audit logs corresponding to portions of new or modified source code uploaded to the source code repository, and determining a tree data structure of the dependencies included in the source code.

17. The method of claim 1, further comprising receiving, at a user activity module of the one or more modules of the cyber security appliance, audit logs corresponding to portions of new or modified source code uploaded to the source code repository, and determining a profile of metrics corresponding to user activity interactions that can be linked to the user represented by the network entity.

18. The method of claim 17, wherein profile of metrics corresponding to user activity interactions comprise one or more of metrics relating to the timing of interactions with the source code repository, an approximate user location during interactions with the source code repository, the regularity with which the user interacts with the source code repository, how much code the user typically uploads to the source code repository at one time, the timing of user network logins, unusual web traffic linked to the user, unusual phone activity linked to the user, abnormal usage of email systems linked to the user, the receipt of abnormal emails by the user, internet browsing history linked to the user, or productivity software usage and configuration.

19. The method of claim 1, wherein the one or more machine learning models trained on a normal benign behavior interacting with the source code repository comprise Bayesian mathematical models trained using unsupervised learning to detect behavioral changes in the activity in the software development environment.

20. A non-transitory computer readable medium including executable instructions that, when executed with one or more processors, cause a cyber security appliance to perform the method of claim 1.

21. A method for a cyber security appliance incorporating data from a source code repository, hosted by a software development environment, to identify cyber threats related to source code being stored and developed in that source code repository, the method comprising:
   receiving, at one or more modules of the cyber security appliance executed by a processor during operation, data indicating a network entity representing a user's interaction with the source code repository, the data including audit logs corresponding to portions of new or modified source code uploaded to the source code repository;
   determining a profile of metrics corresponding to user activity interactions that can be linked to the user represented by the network entity, the profile of metrics corresponds to user activity interactions that comprises one or more of metrics relating to one or more of (i) timing of interactions with the source code repository, (ii) an approximate user location during interactions with the source code repository, (iii) how much code the user typically uploads to the source code repository at one time, (iv) the timing of user network logins, (v) unusual web traffic linked to the user, (vi) unusual phone activity linked to the user, (vii) abnormal usage of email systems linked to the user, (viii) the receipt of abnormal emails by the user, (ix) internet browsing history linked to the user, or (x) productivity software usage and configuration;
   providing the data received from the one or more modules to one or more machine learning models trained on a normal benign behavior interacting with the source code repository using a normal behavior benchmark describing parameters corresponding to a normal interaction behavior;
   identifying whether the data indicating the network entities interaction with the source code repository corresponds to behavior that deviates from the normal benign behavior;
   identifying whether a threshold level of deviation from the normal benign behavior has been exceeded; and
   if the threshold level of deviation from the normal benign behavior has been exceeded, determining that a cyber threat may be present and executing an autonomous response to restrict the network entities interaction with the source code repository.

* * * * *